(12) United States Patent
Fox

(10) Patent No.: US 6,340,972 B1
(45) Date of Patent: Jan. 22, 2002

(54) GRAPHICS ADAPTER HAVING A VERSATILE LIGHTING ENGINE

(75) Inventor: Thomas Winters Fox, Georgetown, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/165,085

(22) Filed: Oct. 2, 1998

(51) Int. Cl.[7] .............................................. G06F 15/00
(52) U.S. Cl. ...................................................... 345/426
(58) Field of Search ................................ 345/418, 426, 345/433, 419, 435, 428

(56) References Cited

U.S. PATENT DOCUMENTS 5,734,387 A * 3/1998 Patrick et al. .............. 345/441
6,172,678 B1 * 1/2001 Shiraishi ..................... 345/419

* cited by examiner

*Primary Examiner*—Phu K. Nguyen
(74) *Attorney, Agent, or Firm*—Leslie A. Van Leeuwen; Bracewell & Patterson, L.L.P.

(57) ABSTRACT

A graphics adapter having a versatile lighting engine is disclosed. The graphics adapter generates graphics objects in a graphics scene. Each of the graphics objects within the graphics scene is made up of a number of polygons that are delimited by a set of vertices. The graphics adapter includes a graphics pipeline and a control module. In response to attributes received from a graphics software application, the control module selectively controls a frequency in which vertices are fed into the graphics pipeline and controls a number of concurrent calculations that are performed on the vertices within the graphics pipeline.

14 Claims, 22 Drawing Sheets

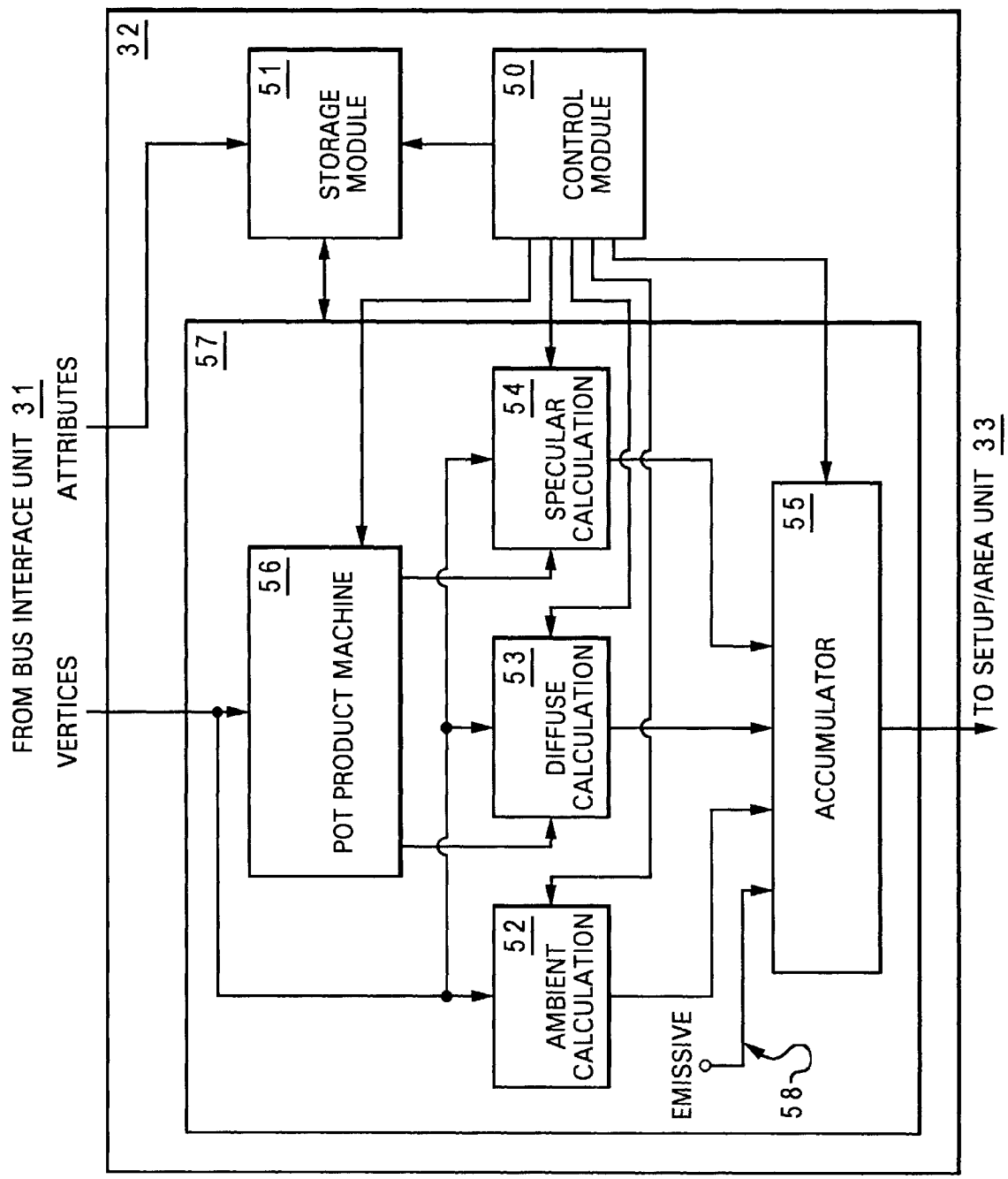

Fig. 4a

| Cycle | | 1 | 2 |
|---|---|---|---|
| $A_{24} \times B_{24}$ | a | $N_x * L_x(0)$ | $N_x * H_x(0)$ |
| $A_{24} \times B_{24}$ | b | $N_y * L_y(0)$ | $N_y * H_y(0)$ |
| $A_{24} \times B_{24}$ | c | $N_z * L_z(0)$ | $N_z * H_z(0)$ |
| $A_{48} + B_{48} + C_{48}$ | abc | $N \cdot L(0) = N_x * L_x + N_y * L_y + N_z * L_z$ | $N \cdot H(0) = N_x * H_x + N_y * H_y + N_z * H_z$ |
| $A_{12} \times B_{12}$ | d | $MatIF_{diff\,r} * L_{diff\,r}(0)$ | $MatIF_{amb\,r} * L_{amb\,r}(0)$ |
| $A_{12} \times B_{12}$ | e | $MatIF_{diff\,g} * L_{diff\,g}(0)$ | $MatIF_{amb\,g} * L_{amb\,g}(0)$ |
| $A_{12} \times B_{12}$ | f | $MatIF_{diff\,b} * L_{diff\,b}(0)$ | $MatIF_{amb\,b} * L_{amb\,b}(0)$ |
| $A_{12} \times B_{12}$ | g | $MatIF_{amb\,r} * Model_{amb\,r}$ | $MatIF_{spec\,r} * L_{spec\,r}(0)$ |
| $A_{12} \times B_{12}$ | h | $MatIF_{amb\,g} * Model_{amb\,g}$ | $MatIF_{spec\,g} * L_{spec\,g}(0)$ |
| $A_{12} \times B_{12}$ | i | $MatIF_{amb\,b} * Model_{amb\,b}$ | $MatIF_{spec\,b} * L_{spec\,b}(0)$ |
| $A_{24} \times B_{12}$ | j | | $MatIB_{amb\,r} * Model_{amb\,r}$ |
| $A_{24} \times B_{12}$ | k | | $MatIB_{amb\,g} * Model_{amb\,g}$ |
| $A_{24} \times B_{12}$ | l | | $MatIB_{amb\,b} * Model_{amb\,b}$ |
| $A_{24} \times B_{12}$ | m | | |
| $A_{24} \times B_{12}$ | n | | |
| $A_{24} \times B_{12}$ | o | | |
| $A_{16} + B_{16}$ | p | | |
| $A_{23} + B_{23}$ | q | | |
| $A_{17} + B_{12} + C_{12}$ | red 1 | | |
| $A_{17} + B_{12} + C_{12}$ | green 1 | | |
| $A_{17} + B_{12} + C_{12}$ | blue 1 | | |
| $A_{12} + B_{12} + C_{12}$ | red 2 | | $C_{FADr} = FAD_R + MatIF_{emis\,r} + MatIF_{amb\,r} * Model_{amb\,r}$ |
| $A_{12} + B_{12} + C_{12}$ | green 2 | | $C_{FADg} = FAD_G + MatIF_{emis\,g} + MatIF_{amb\,g} * Model_{amb\,g}$ |
| $A_{12} + B_{12} + C_{12}$ | blue 2 | | $C_{FADb} = FAD_B + MatIF_{emis\,b} + MatIF_{amb\,b} * Model_{amb\,b}$ |

Fig. 46

| Cycle | | 3 | 4 |
|---|---|---|---|
| $A_{24} \times B_{24}$ | a | $N \cdot H(0) * N \cdot L(0)$ | $N_x * L_x(1)$ |
| $A_{24} \times B_{24}$ | b | $N \cdot H(0) * N \cdot L(0)$ | $N_y * L_y(1)$ |
| $A_{24} \times B_{24}$ | c | $K(0) * 1.0$ | $N_z * L_z(1)$ |
| $A_{48} + B_{48} + C_{48}$ | abc | $E \cdot R(0) = (N \cdot H * N \cdot L) + (N \cdot H * N \cdot L) + K(0)$ | $N \cdot L(1) = N_x * L_x + N_y * L_y + N_z * L_z$ |
| $A_{12} \times B_{12}$ | d | $MatlB_{amb\ r} * L_{amb\ r}(0)$ | $MatlF_{diff\ r} * L_{diff\ r}(1)$ |
| $A_{12} \times B_{12}$ | e | $MatlB_{amb\ g} * L_{amb\ g}(0)$ | $MatlF_{diff\ g} * L_{diff\ g}(1)$ |
| $A_{12} \times B_{12}$ | f | $MatlB_{amb\ b} * L_{amb\ b}(0)$ | $MatlF_{diff\ b} * L_{diff\ b}(1)$ |
| $A_{12} \times B_{12}$ | g | $MatlB_{diff\ r} * L_{diff\ r}(0)$ | RESERVED |
| $A_{12} \times B_{12}$ | h | $MatlB_{diff\ g} * L_{diff\ g}(0)$ | RESERVED |
| $A_{12} \times B_{12}$ | i | $MatlB_{diff\ b} * L_{diff\ b}(0)$ | RESERVED |
| $A_{24} \times B_{12}$ | j | $MatlB_{spec\ r} * L_{spec\ r}(0)$ | $N \cdot L(0) * Matl_{diff\ r} * L_{diff\ r}(0)$ |
| $A_{24} \times B_{12}$ | k | $MatlB_{spec\ g} * L_{spec\ g}(0)$ | $N \cdot L(0) * Matl_{diff\ g} * L_{diff\ g}(0)$ |
| $A_{24} \times B_{12}$ | l | $MatlB_{spec\ b} * L_{spec\ b}(0)$ | $N \cdot L(0) * Matl_{diff\ b} * L_{diff\ b}(0)$ |
| $A_{24} \times B_{12}$ | m | | |
| $A_{24} \times B_{12}$ | n | | |
| $A_{24} \times B_{12}$ | o | | |
| $A_{16} + B_{16}$ | p | | |
| $A_{23} + B_{23}$ | q | | $lookupvalueF(0) = N \cdot H(0) + cutoffFront$ |
| $A_{17} + B_{12} + C_{12}$ | red 1 | | |
| $A_{17} + B_{12} + C_{12}$ | green 1 | | |
| $A_{17} + B_{12} + C_{12}$ | blue 1 | | |
| $A_{12} + B_{12} + C_{12}$ | red 2 | $C_{BADr} = BAD_R + MatlB_{emis\ r} + MatlB_{amb\ r} * Model_{amb\ r}$ | |
| $A_{12} + B_{12} + C_{12}$ | green 2 | $C_{BADg} = BAD_G + MatlB_{emis\ g} + MatlB_{amb\ g} * Model_{amb\ g}$ | |
| $A_{12} + B_{12} + C_{12}$ | blue 2 | $C_{BADb} = BAD_B + MatlB_{emis\ b} + MatlB_{amb\ b} * Model_{amb\ b}$ | |

Fig. 4c

| Cycle | | 5 | 6 |
|---|---|---|---|
| $A_{24} \times B_{24}$ | a | $N_x * H_x(1)$ | $N \cdot H(1) * N \cdot L(1)$ |
| $A_{24} \times B_{24}$ | b | $N_y * H_y(1)$ | $N \cdot H(1) * N \cdot L(1)$ |
| $A_{24} \times B_{24}$ | c | $N_z * H_z(1)$ | $K(1) * 1.0$ |
| $A_{48} + B_{48} + C_{48}$ | abc | $N \cdot H(1) = N_x * H_x + N_y * H_y + N_z * H_z$ | $E \cdot R(1) = (N \cdot H * N \cdot L) + (N \cdot H * N \cdot L) + K(1)$ |
| $A_{12} \times B_{12}$ | d | $MatlF_{amb\ r} * L_{amb\ r}(1)$ | $MatlB_{amb\ r} * L_{amb\ r}(1)$ |
| $A_{12} \times B_{12}$ | e | $MatlF_{amb\ g} * L_{amb\ g}(1)$ | $MatlB_{amb\ g} * L_{amb\ g}(1)$ |
| $A_{12} \times B_{12}$ | f | $MatlF_{amb\ b} * L_{amb\ b}(1)$ | $MatlB_{amb\ b} * L_{amb\ b}(1)$ |
| $A_{12} \times B_{12}$ | g | $MatlF_{spec\ r} * L_{spec\ r}(1)$ | $MatlB_{diff\ r} * L_{diff\ r}(1)$ |
| $A_{12} \times B_{12}$ | h | $MatlF_{spec\ g} * L_{spec\ g}(1)$ | $MatlB_{diff\ g} * L_{diff\ g}(1)$ |
| $A_{12} \times B_{12}$ | i | $MatlF_{spec\ b} * L_{spec\ b}(1)$ | $MatlB_{diff\ b} * L_{diff\ b}(1)$ |
| $A_{24} \times B_{12}$ | j | RESERVED | $MatlB_{spec\ r} * L_{spec\ r}(1)$ |
| $A_{24} \times B_{12}$ | k | RESERVED | $MatlB_{spec\ g} * L_{spec\ g}(1)$ |
| $A_{24} \times B_{12}$ | l | RESERVED | $MatlB_{spec\ b} * L_{spec\ b}(1)$ |
| $A_{24} \times B_{12}$ | m | lookupvalueF(0) * invDeltaFront | lookupvalueB(0) * invDeltaBack |
| $A_{24} \times B_{12}$ | n | | |
| $A_{24} \times B_{12}$ | o | | |
| $A_{16} + B_{16}$ | p | | |
| $A_{23} + B_{23}$ | q | $lookupvalueB(0) = \overline{N \cdot H(0)} + cutoffBack$ | |
| $A_{17} + B_{12} + C_{12}$ | red 1 | | $C_{BADr} = C_{BADr} +$ $MatlB_{amb\ r} * L_{amb\ r}(0) +$ $\overline{N \cdot L(0)} * MatlB_{diff\ r} * L_{diff\ r}(0)$ |
| $A_{17} + B_{12} + C_{12}$ | green 1 | | $C_{BADg} = C_{BADg} +$ $MatlB_{amb\ g} * L_{amb\ g}(0) +$ $\overline{N \cdot L(0)} * MatlB_{diff\ g} * L_{diff\ g}(0)$ |
| $A_{17} + B_{12} + C_{12}$ | blue 1 | | $C_{BADb} = C_{BADb} +$ $MatlB_{amb\ b} * L_{amb\ b}(0) +$ $\overline{N \cdot L(0)} * MatlB_{diff\ b} * L_{diff\ b}(0)$ |
| $A_{12} + B_{12} + C_{12}$ | red 2 | | |
| $A_{12} + B_{12} + C_{12}$ | green 2 | | |
| $A_{12} + B_{12} + C_{12}$ | blue 2 | | |

Fig. 4d

| Cycle | | 7 | 8 |
|---|---|---|---|
| $A_{24} \times B_{24}$ | a | $N_x * L_x(2)$ | $N_x * H_x(2)$ |
| $A_{24} \times B_{24}$ | b | $N_y * L_y(2)$ | $N_y * H_y(2)$ |
| $A_{24} \times B_{24}$ | c | $N_z * L_z(2)$ | $N_z * H_z(2)$ |
| $A_{48} + B_{48} + C_{48}$ | abc | $N \bullet L(2) = N_x*L_x + N_y*L_y + N_z*L_z$ | $N \bullet H(2) = N_x*H_x + N_y*H_y + N_z*H_z$ |
| $A_{12} \times B_{12}$ | d | $MatIF_{diff\ r} * L_{diff\ r}(2)$ | $MatIF_{amb\ r} * L_{amb\ r}(2)$ |
| $A_{12} \times B_{12}$ | e | $MatIF_{diff\ g} * L_{diff\ g}(2)$ | $MatIF_{amb\ g} * L_{amb\ g}(2)$ |
| $A_{12} \times B_{12}$ | f | $MatIF_{diff\ b} * L_{diff\ b}(2)$ | $MatIF_{amb\ b} * L_{amb\ b}(2)$ |
| $A_{12} \times B_{12}$ | g | RESERVED | $MatIF_{spec\ r} * L_{spec\ r}(2)$ |
| $A_{12} \times B_{12}$ | h | RESERVED | $MatIF_{spec\ g} * L_{spec\ g}(2)$ |
| $A_{12} \times B_{12}$ | i | RESERVED | $MatIF_{spec\ b} * L_{spec\ b}(2)$ |
| $A_{24} \times B_{12}$ | j | $N \bullet L(1) * MatI_{diff\ r} * L_{diff\ r}(1)$ | RESERVED |
| $A_{24} \times B_{12}$ | k | $N \bullet L(1) * MatI_{diff\ g} * L_{diff\ g}(1)$ | RESERVED |
| $A_{24} \times B_{12}$ | l | $N \bullet L(1) * MatI_{diff\ b} * L_{diff\ b}(1)$ | RESERVED |
| $A_{24} \times B_{12}$ | m | | $lookupvalueF(1) * invDeltaFront$ |
| $A_{24} \times B_{12}$ | n | | $N \bullet H_{LU}(0) = \{\{[\sim D_f(i_{f0})+1] + D_f(i_{f0}+1)\} * \alpha_{f0}\} + D_f(i_{f0})$ |
| $A_{24} \times B_{12}$ | o | | |
| $A_{16} + B_{16}$ | p | $[\sim D_f(i_{f0})+1] + D_f(i_{f0}+1)$ | $[\sim D_b(i_{b0})+1] + D_b(i_{b0}+1)$ |
| $A_{23} + B_{23}$ | q | $lookupvalueF(1) = N \bullet H(1) + cutoffFront$ | $lookupvalueB(1) = \overline{N \bullet H(1)} + cutoffBack$ |
| $A_{17} + B_{12} + C_{12}$ | red 1 | $C_{FADr} = C_{FADr} + MatIF_{amb\ r} * L_{amb\ r}(0) + N \bullet L(0) * MatIF_{diff\ r} * L_{diff\ r}(0)$ | |
| $A_{17} + B_{12} + C_{12}$ | green 1 | $C_{FADg} = C_{FADg} + MatIF_{amb\ g} * L_{amb\ g}(0) + N \bullet L(0) * MatIF_{diff\ g} * L_{diff\ g}(0)$ | |
| $A_{17} + B_{12} + C_{12}$ | blue 1 | $C_{FADb} = C_{FADb} + MatIF_{amb\ b} * L_{amb\ b}(0) + N \bullet L(0) * MatIF_{diff\ b} * L_{diff\ b}(0)$ | |
| $A_{12} + B_{12} + C_{12}$ | red 2 | | |
| $A_{12} + B_{12} + C_{12}$ | green 2 | | |
| $A_{12} + B_{12} + C_{12}$ | blue 2 | | |

Fig. 4e

| Cycle | | 9 | 10 |
|---|---|---|---|
| $A_{24} \times B_{24}$ | a | $N \cdot H(2) * N \cdot L(2)$ | $N_x * L_x(3)$ |
| $A_{24} \times B_{24}$ | b | $N \cdot H(2) * N \cdot L(2)$ | $N_y * L_y(3)$ |
| $A_{24} \times B_{24}$ | c | $K(2) * 1.0$ | $N_z * L_z(3)$ |
| $A_{48} + B_{48} + C_{48}$ | abc | $E \cdot R(2) = (N \cdot H * N \cdot L) + (N \cdot H * N \cdot L) + K(2)$ | $N \cdot L(3) = N_x * L_x + N_y * L_y + N_z * L_z$ |
| $A_{12} \times B_{12}$ | d | $MatIB_{amb\ r} * L_{amb\ r}(2)$ | $MatIF_{diff\ r} * L_{diff\ r}(3)$ |
| $A_{12} \times B_{12}$ | e | $MatIB_{amb\ g} * L_{amb\ g}(2)$ | $MatIF_{diff\ g} * L_{diff\ g}(3)$ |
| $A_{12} \times B_{12}$ | f | $MatIB_{amb\ b} * L_{amb\ b}(2)$ | $MatIF_{diff\ b} * L_{diff\ b}(3)$ |
| $A_{12} \times B_{12}$ | g | $MatIB_{diff\ r} * L_{diff\ r}(2)$ | RESERVED |
| $A_{12} \times B_{12}$ | h | $MatIB_{diff\ g} * L_{diff\ g}(2)$ | RESERVED |
| $A_{12} \times B_{12}$ | i | $MatIB_{diff\ b} * L_{diff\ b}(2)$ | RESERVED |
| $A_{24} \times B_{12}$ | j | $MatIB_{spec\ r} * L_{spec\ r}(2)$ | $N \cdot L(2) * MatI_{diff\ r} * L_{diff\ r}(2)$ |
| $A_{24} \times B_{12}$ | k | $MatIB_{spec\ g} * L_{spec\ g}(2)$ | $N \cdot L(2) * MatI_{diff\ g} * L_{diff\ g}(2)$ |
| $A_{24} \times B_{12}$ | l | $MatIB_{spec\ b} * L_{spec\ b}(2)$ | $N \cdot L(2) * MatI_{diff\ b} * L_{diff\ b}(2)$ |
| $A_{24} \times B_{12}$ | m | $lookupvalueB(1) * invDeltaBack$ | $\overline{N \cdot H}_{LU}(0) * MatI_{spec\ r} * L_{spec\ r}(0)$ |
| $A_{24} \times B_{12}$ | n | $\overline{N \cdot H}_{LU}(0) = \{\{[\sim D_b(i_{b0})+1] + D_b(i_{b0}+1)\} * \alpha_{b0}\} + D_b(i_{b0})]$ | $\overline{N \cdot H}_{LU}(0) * MatI_{spec\ g} * L_{spec\ g}(0)$ |
| $A_{24} \times B_{12}$ | o | | $\overline{N \cdot H}_{LU}(0) * MatI_{spec\ b} * L_{spec\ b}(0)$ |
| $A_{16} + B_{16}$ | p | | $[\sim D_f(i_{f1})+1] + D_f(i_{f1}+1)$ |
| $A_{23} + B_{23}$ | q | | $lookupvalueF(2) = N \cdot H(2) + cutoffFront$ |
| $A_{17} + B_{12} + C_{12}$ | red 1 | $C_{BADr} = C_{BADr} + MatIB_{amb\ r} * L_{amb\ r}(1) + \overline{N \cdot L}(1) * MatIB_{diff\ r} * L_{diff\ r}(1)$ | $C_{FADr} = C_{FADr} + MatIF_{amb\ r} * L_{amb\ r}(1) + N \cdot L(1) * MatIF_{diff\ r} * L_{diff\ r}(1)$ |
| $A_{17} + B_{12} + C_{12}$ | green 1 | $C_{BADg} = C_{BADg} + MatIB_{amb\ g} * L_{amb\ g}(1) + \overline{N \cdot L}(1) * MatIB_{diff\ g} * L_{diff\ g}(1)$ | $C_{FADg} = C_{FADg} + MatIF_{amb\ g} * L_{amb\ g}(1) + N \cdot L(1) * MatIF_{diff\ g} * L_{diff\ g}(1)$ |
| $A_{17} + B_{12} + C_{12}$ | blue 1 | $C_{BADb} = C_{BADb} + MatIB_{amb\ b} * L_{amb\ b}(1) + \overline{N \cdot L}(1) * MatIB_{diff\ b} * L_{diff\ b}(1)$ | $C_{FADb} = C_{FADb} + MatIF_{amb\ b} * L_{amb\ b}(1) + N \cdot L(1) * MatIF_{diff\ b} * L_{diff\ b}(1)$ |
| $A_{12} + B_{12} + C_{12}$ | red 2 | | |
| $A_{12} + B_{12} + C_{12}$ | green 2 | | |
| $A_{12} + B_{12} + C_{12}$ | blue 2 | | |

Fig. 4f

| Cycle | | 11 | 12 |
|---|---|---|---|
| $A_{24} \times B_{24}$ | a | $N_x * H_x(3)$ | $N \cdot H(3) * N \cdot L(3)$ |
| $A_{24} \times B_{24}$ | b | $N_y * H_y(3)$ | $N \cdot H(3) * N \cdot L(3)$ |
| $A_{24} \times B_{24}$ | c | $N_z * H_z(3)$ | $K(3) * 1.0$ |
| $A_{48} + B_{48} + C_{48}$ | abc | $N \cdot H(3) = N_x * H_x + N_y * H_y + N_z * H_z$ | $E \cdot R(3) = (N \cdot H * N \cdot L) + (N \cdot H * N \cdot L) + K(3)$ |
| $A_{12} \times B_{12}$ | d | $MatlF_{amb\,r} * L_{amb\,r}(3)$ | $MatlB_{amb\,r} * L_{amb\,r}(3)$ |
| $A_{12} \times B_{12}$ | e | $MatlF_{amb\,g} * L_{amb\,g}(3)$ | $MatlB_{amb\,g} * L_{amb\,g}(3)$ |
| $A_{12} \times B_{12}$ | f | $MatlF_{amb\,b} * L_{amb\,b}(3)$ | $MatlB_{amb\,b} * L_{amb\,b}(3)$ |
| $A_{12} \times B_{12}$ | g | $MatlF_{spec\,r} * L_{spec\,r}(3)$ | $MatlB_{diff\,r} * L_{diff\,r}(3)$ |
| $A_{12} \times B_{12}$ | h | $MatlF_{spec\,g} * L_{spec\,g}(3)$ | $MatlB_{diff\,g} * L_{diff\,g}(3)$ |
| $A_{12} \times B_{12}$ | i | $MatlF_{spec\,b} * L_{spec\,b}(3)$ | $MatlB_{diff\,b} * L_{diff\,b}(3)$ |
| $A_{24} \times B_{12}$ | j | RESERVED | $MatlB_{spec\,r} * L_{spec\,r}(3)$ |
| $A_{24} \times B_{12}$ | k | RESERVED | $MatlB_{spec\,g} * L_{spec\,g}(3)$ |
| $A_{24} \times B_{12}$ | l | RESERVED | $MatlB_{spec\,b} * L_{spec\,b}(3)$ |
| $A_{24} \times B_{12}$ | m | lookupvalueF(2) * invDeltaFront | lookupvalueB(2) * invDeltaBack |
| $A_{24} \times B_{12}$ | n | $N \cdot H_{LU}(1) = \{\{[\sim D_f(i_{f1})+1] + D_f(i_{f1}+1)\} * \alpha_{f1}\} + D_f(i_{f1})$ | $\overline{N \cdot H_{LU}(1)} = \{\{[\sim D_b(i_{b1})+1] + D_b(i_{b1}+1)\} * \alpha_{b1}\} + D_b(i_{b1})$ |
| $A_{24} \times B_{12}$ | o | | |
| $A_{16} + B_{16}$ | p | $[\sim D_b(i_{b1})+1] + D_b(i_{b1}+1)$ | |
| $A_{23} + B_{23}$ | q | $lookupvalueB(2) = \overline{N \cdot H}(2) + cutoffBack$ | |
| $A_{17} + B_{12} + C_{12}$ | red 1 | $C_r = C_r + N \cdot H_{LU}(0) * Matl_{spec\,r} * L_{spec\,r}(0) + 0$ | $C_{BADr} = C_{BADr} + MatlB_{amb\,r} * L_{amb\,r}(2) + \overline{N \cdot L}(2) * MatlB_{diff\,r} * L_{diff\,r}(2)$ |
| $A_{17} + B_{12} + C_{12}$ | green 1 | $C_g = C_g + N \cdot H_{LU}(0) * Matl_{spec\,g} * L_{spec\,g}(0) + 0$ | $C_{BADg} = C_{BADg} + MatlB_{amb\,g} * L_{amb\,g}(2) + \overline{N \cdot L}(2) * MatlB_{diff\,g} * L_{diff\,g}(2)$ |
| $A_{17} + B_{12} + C_{12}$ | blue 1 | $C_b = C_b + N \cdot H_{LU}(0) * Matl_{spec\,b} * L_{spec\,b}(0) + 0$ | $C_{BADb} = C_{BADb} + MatlB_{amb\,b} * L_{amb\,b}(2) + \overline{N \cdot L}(2) * MatlB_{diff\,b} * L_{diff\,b}(2)$ |
| $A_{12} + B_{12} + C_{12}$ | red 2 | | |
| $A_{12} + B_{12} + C_{12}$ | green 2 | | |
| $A_{12} + B_{12} + C_{12}$ | blue 2 | | |

Fig. 4g

| Cycle | | 13 | 14 |
|---|---|---|---|
| $A_{24} \times B_{24}$ | a | $N_x * L_x$(4) | $N_x * H_x$(4) |
| $A_{24} \times B_{24}$ | b | $N_y * L_y$(4) | $N_y * H_y$(4) |
| $A_{24} \times B_{24}$ | c | $N_z * L_z$(4) | $N_z * H_z$(4) |
| $A_{48} + B_{48} + C_{48}$ | abc | $N \cdot L(4) = N_x * L_x + N_y * L_y + N_z * L_z$ | $N \cdot H(4) = N_x * H_x + N_y * H_y + N_z * H_z$ |
| $A_{12} \times B_{12}$ | d | $MatIF_{diff\ r} * L_{diff\ r}$(4) | $MatIF_{amb\ r} * L_{amb\ r}$(4) |
| $A_{12} \times B_{12}$ | e | $MatIF_{diff\ g} * L_{diff\ g}$(4) | $MatIF_{amb\ g} * L_{amb\ g}$(4) |
| $A_{12} \times B_{12}$ | f | $MatIF_{diff\ b} * L_{diff\ b}$(4) | $MatIF_{amb\ b} * L_{amb\ b}$(4) |
| $A_{12} \times B_{12}$ | g | RESERVED | $MatIF_{spec\ r} * L_{spec\ r}$(4) |
| $A_{12} \times B_{12}$ | h | RESERVED | $MatIF_{spec\ g} * L_{spec\ g}$(4) |
| $A_{12} \times B_{12}$ | i | RESERVED | $MatIF_{spec\ b} * L_{spec\ b}$(4) |
| $A_{24} \times B_{12}$ | j | $N \cdot L(3) * Matl_{diff\ r} * L_{diff\ r}$(3) | RESERVED |
| $A_{24} \times B_{12}$ | k | $N \cdot L(3) * Matl_{diff\ g} * L_{diff\ g}$(3) | RESERVED |
| $A_{24} \times B_{12}$ | l | $N \cdot L(3) * Matl_{diff\ b} * L_{diff\ b}$(3) | RESERVED |
| $A_{24} \times B_{12}$ | m | $N \cdot H_{LU}(1) * Matl_{spec\ r} * L_{spec\ r}$(1) | lookupvalueF(3) * invDeltaFront |
| $A_{24} \times B_{12}$ | n | $N \cdot H_{LU}(1) * Matl_{spec\ g} * L_{spec\ g}$(1) | $N \cdot H_{LU}(2) = \{\{[\sim D_f(i_{f2})+1] + D_f(i_{f2}+1)\} * \alpha_{f2}\} + D_f(i_{f2})]$ |
| $A_{24} \times B_{12}$ | o | $N \cdot H_{LU}(1) * Matl_{spec\ b} * L_{spec\ b}$(1) | |
| $A_{16} + B_{16}$ | p | $[\sim D_f(i_{f2})+1] + D_f(i_{f2}+1)$ | $[\sim D_b(i_{b2})+1] + D_b(i_{b2}+1)$ |
| $A_{23} + B_{23}$ | q | lookupvalueF(3) = $N \cdot H(3)$ + cutoffFront | lookupvalueB(3) = $\overline{N \cdot H}(3)$ + cutoffBack |
| $A_{17} + B_{12} + C_{12}$ | red 1 | $C_{FADr} = C_{FADr} + MatIF_{amb\ r} * L_{amb\ r}(2) + N \cdot L(2) * MatIF_{diff\ r} * L_{diff\ r}(2)$ | $C_r = C_r + N \cdot H_{LU}(1) * Matl_{spec\ r} * L_{spec\ r}(1) + 0$ |
| $A_{17} + B_{12} + C_{12}$ | green 1 | $C_{FADg} = C_{FADg} + MatIF_{amb\ g} * L_{amb\ g}(2) + N \cdot L(2) * MatIF_{diff\ g} * L_{diff\ g}(2)$ | $C_g = C_g + N \cdot H_{LU}(1) * Matl_{spec\ g} * L_{spec\ g}(1) + 0$ |
| $A_{17} + B_{12} + C_{12}$ | blue 1 | $C_{FADb} = C_{FADb} + MatIF_{amb\ b} * L_{amb\ b}(2) + N \cdot L(2) * MatIF_{diff\ b} * L_{diff\ b}(2)$ | $C_b = C_b + N \cdot H_{LU}(1) * Matl_{spec\ b} * L_{spec\ b}(1) + 0$ |
| $A_{12} + B_{12} + C_{12}$ | red 2 | | |
| $A_{12} + B_{12} + C_{12}$ | green 2 | | |
| $A_{12} + B_{12} + C_{12}$ | blue 2 | | |

Fig. 4h

| Cycle | | 15 | 16 |
|---|---|---|---|
| $A_{24} \times B_{24}$ | a | $N \cdot H(4) * N \cdot L(4)$ | $N_x * L_x{}^{(5)}$ |
| $A_{24} \times B_{24}$ | b | $N \cdot H(4) * N \cdot L(4)$ | $N_y * L_y{}^{(5)}$ |
| $A_{24} \times B_{24}$ | c | $K(4) * 1.0$ | $N_z * L_z{}^{(5)}$ |
| $A_{48} + B_{48} + C_{48}$ | abc | $E \cdot R(4) = (N \cdot H * N \cdot L) + (N \cdot H * N \cdot L) + K(4)$ | $N \cdot L(5) = N_x * L_x + N_y * L_y + N_z * L_z$ |
| $A_{12} \times B_{12}$ | d | $MatIB_{amb\ r} * L_{amb\ r}{}^{(4)}$ | $MatIF_{diff\ r} * L_{diff\ r}{}^{(5)}$ |
| $A_{12} \times B_{12}$ | e | $MatIB_{amb\ g} * L_{amb\ g}{}^{(4)}$ | $MatIF_{diff\ g} * L_{diff\ g}{}^{(5)}$ |
| $A_{12} \times B_{12}$ | f | $MatIB_{amb\ b} * L_{amb\ b}{}^{(4)}$ | $MatIF_{diff\ b} * L_{diff\ b}{}^{(5)}$ |
| $A_{12} \times B_{12}$ | g | $MatIB_{diff\ r} * L_{diff\ r}{}^{(4)}$ | RESERVED |
| $A_{12} \times B_{12}$ | h | $MatIB_{diff\ g} * L_{diff\ g}{}^{(4)}$ | RESERVED |
| $A_{12} \times B_{12}$ | i | $MatIB_{diff\ b} * L_{diff\ b}{}^{(4)}$ | RESERVED |
| $A_{24} \times B_{12}$ | j | $MatIB_{spec\ r} * L_{spec\ r}{}^{(4)}$ | $N \cdot L(4) * Matl_{diff\ r} * L_{diff\ r}{}^{(4)}$ |
| $A_{24} \times B_{12}$ | k | $MatIB_{spec\ g} * L_{spec\ g}{}^{(4)}$ | $N \cdot L(4) * Matl_{diff\ g} * L_{diff\ g}{}^{(4)}$ |
| $A_{24} \times B_{12}$ | l | $MatIB_{spec\ b} * L_{spec\ b}{}^{(4)}$ | $N \cdot L(4) * Matl_{diff\ b} * L_{diff\ b}{}^{(4)}$ |
| $A_{24} \times B_{12}$ | m | $lookupvalueB(3) * invDeltaBack$ | $N \cdot H_{LU}(2) * Matl_{spec\ r} * L_{spec\ r}{}^{(2)}$ |
| $A_{24} \times B_{12}$ | n | $\overline{N \cdot H_{LU}}(2) = \{\{[\sim D_b(i_{b2})+1] + D_b(i_{b2}+1)\} * \alpha_{b2}\} + D_b(i_{b2})$ | $N \cdot H_{LU}(2) * Matl_{spec\ g} * L_{spec\ g}{}^{(2)}$ |
| $A_{24} \times B_{12}$ | o | | $N \cdot H_{LU}(2) * Matl_{spec\ b} * L_{spec\ b}{}^{(2)}$ |
| $A_{16} + B_{16}$ | p | | $[\sim D_f(i_{f3})+1] + D_f(i_{f3}+1)$ |
| $A_{23} + B_{23}$ | q | | $lookupvalueF(4) = N \cdot H(4) + cutoffFront$ |
| $A_{17} + B_{12} + C_{12}$ | red 1 | $C_{BADr} = C_{BADr} + MatIB_{amb\ r} * L_{amb\ r}{}^{(3)} + \overline{N \cdot L}(3) * MatIB_{diff\ r} * L_{diff\ r}{}^{(3)}$ | $C_{FADr} = C_{FADr} + MatIF_{amb\ r} * L_{amb\ r}{}^{(3)} + N \cdot L(3) * MatIF_{diff\ r} * L_{diff\ r}{}^{(3)}$ |
| $A_{17} + B_{12} + C_{12}$ | green 1 | $C_{BADg} = C_{BADg} + MatIB_{amb\ g} * L_{amb\ g}{}^{(3)} + \overline{N \cdot L}(3) * MatIB_{diff\ g} * L_{diff\ g}{}^{(3)}$ | $C_{FADg} = C_{FADg} + MatIF_{amb\ g} * L_{amb\ g}{}^{(3)} + N \cdot L(3) * MatIF_{diff\ g} * L_{diff\ g}{}^{(3)}$ |
| $A_{17} + B_{12} + C_{12}$ | blue 1 | $C_{BADb} = C_{BADb} + MatIB_{amb\ b} * L_{amb\ b}{}^{(3)} + \overline{N \cdot L}(3) * MatIB_{diff\ b} * L_{diff\ b}{}^{(3)}$ | $C_{FADb} = C_{FADb} + MatIF_{amb\ b} * L_{amb\ b}{}^{(3)} + N \cdot L(3) * MatIF_{diff\ b} * L_{diff\ b}{}^{(3)}$ |
| $A_{12} + B_{12} + C_{12}$ | red 2 | | |
| $A_{12} + B_{12} + C_{12}$ | green 2 | | |
| $A_{12} + B_{12} + C_{12}$ | blue 2 | | |

*Fig. 4i*

| Cycle | | 17 | 18 |
|---|---|---|---|
| $A_{24} \times B_{24}$ | a | $N_x * H_x(5)$ | $N \cdot H(5) * N \cdot L(5)$ |
| $A_{24} \times B_{24}$ | b | $N_y * H_y(5)$ | $N \cdot H(5) * N \cdot L(5)$ |
| $A_{24} \times B_{24}$ | c | $N_z * H_z(5)$ | $K(5) * 1.0$ |
| $A_{48} + B_{48} + C_{48}$ | abc | $N \cdot H(5) = N_x * H_x + N_y * H_y + N_z * H_z$ | $E \cdot R(5) = (N \cdot H * N \cdot L) + (N \cdot H * N \cdot L) + K(5)$ |
| $A_{12} \times B_{12}$ | d | $MatlF_{amb\ r} * L_{amb\ r}(5)$ | $MatlB_{amb\ r} * L_{amb\ r}(5)$ |
| $A_{12} \times B_{12}$ | e | $MatlF_{amb\ g} * L_{amb\ g}(5)$ | $MatlB_{amb\ g} * L_{amb\ g}(5)$ |
| $A_{12} \times B_{12}$ | f | $MatlF_{amb\ b} * L_{amb\ b}(5)$ | $MatlB_{amb\ b} * L_{amb\ b}(5)$ |
| $A_{12} \times B_{12}$ | g | $MatlF_{spec\ r} * L_{spec\ r}(5)$ | $MatlB_{diff\ r} * L_{diff\ r}(5)$ |
| $A_{12} \times B_{12}$ | h | $MatlF_{spec\ g} * L_{spec\ g}(5)$ | $MatlB_{diff\ g} * L_{diff\ g}(5)$ |
| $A_{12} \times B_{12}$ | i | $MatlF_{spec\ b} * L_{spec\ b}(5)$ | $MatlB_{diff\ b} * L_{diff\ b}(5)$ |
| $A_{24} \times B_{12}$ | j | RESERVED | $MatlB_{spec\ r} * L_{spec\ r}(5)$ |
| $A_{24} \times B_{12}$ | k | RESERVED | $MatlB_{spec\ g} * L_{spec\ g}(5)$ |
| $A_{24} \times B_{12}$ | l | RESERVED | $MatlB_{spec\ b} * L_{spec\ b}(5)$ |
| $A_{24} \times B_{12}$ | m | lookupvalueF(4) * invDeltaFront | lookupvalueB(4) * invDeltaBack |
| $A_{24} \times B_{12}$ | n | $N \cdot H_{LU}(3) = \{\{[\sim D_f(i_{f3})+1] + D_f(i_{f3}+1)\} * \alpha_{f3}\} + D_f(i_{f3})$ | $\overline{N \cdot H_{LU}}(3) = \{\{[\sim D_b(i_{b3})+1] + D_b(i_{b3}+1)\} * \alpha_{b3}\} + D_b(i_{b3})$ |
| $A_{24} \times B_{12}$ | o | | |
| $A_{16} + B_{16}$ | p | $[\sim D_b(i_{b3})+1] + D_b(i_{b3}+1)$ | |
| $A_{23} + B_{23}$ | q | $lookupvalueB(4) = \overline{N \cdot H}(4) + cutoffBack$ | |
| $A_{17} + B_{12} + C_{12}$ | red 1 | $C_r = C_r + N \cdot H_{LU}(2) * Matl_{spec\ r} * L_{spec\ r}(2) + 0$ | $C_{BADr} = C_{BADr} + MatlB_{amb\ r} * L_{amb\ r}(4) + \overline{N \cdot L}(4) * MatlB_{diff\ r} * L_{diff\ r}(4)$ |
| $A_{17} + B_{12} + C_{12}$ | green 1 | $C_g = C_g + N \cdot H_{LU}(2) * Matl_{spec\ g} * L_{spec\ g}(2) + 0$ | $C_{BADg} = C_{BADg} + MatlB_{amb\ g} * L_{amb\ g}(4) + \overline{N \cdot L}(4) * MatlB_{diff\ g} * L_{diff\ g}(4)$ |
| $A_{17} + B_{12} + C_{12}$ | blue 1 | $C_b = C_b + N \cdot H_{LU}(2) * Matl_{spec\ b} * L_{spec\ b}(2) + 0$ | $C_{BADb} = C_{BADb} + MatlB_{amb\ b} * L_{amb\ b}(4) + \overline{N \cdot L}(4) * MatlB_{diff\ b} * L_{diff\ b}(4)$ |
| $A_{12} + B_{12} + C_{12}$ | red 2 | | |
| $A_{12} + B_{12} + C_{12}$ | green 2 | | |
| $A_{12} + B_{12} + C_{12}$ | blue 2 | | |

Fig. 4j

| Cycle | | 19 | 20 |
|---|---|---|---|
| $A_{24} \times B_{24}$ | a | $N_x * L_x (6)$ | $N_x * H_x (6)$ |
| $A_{24} \times B_{24}$ | b | $N_y * L_y (6)$ | $N_y * H_y (6)$ |
| $A_{24} \times B_{24}$ | c | $N_z * L_z (6)$ | $N_z * H_z (6)$ |
| $A_{48} + B_{48} + C_{48}$ | abc | $N \bullet L(6) = N_x * L_x + N_y * L_y + N_z * L_z$ | $N \bullet H(6) = N_x * H_x + N_y * H_y + N_z * H_z$ |
| $A_{12} \times B_{12}$ | d | $MatIF_{diff\ r} * L_{diff\ r} (6)$ | $MatIF_{amb\ r} * L_{amb\ r} (6)$ |
| $A_{12} \times B_{12}$ | e | $MatIF_{diff\ g} * L_{diff\ g} (6)$ | $MatIF_{amb\ g} * L_{amb\ g} (6)$ |
| $A_{12} \times B_{12}$ | f | $MatIF_{diff\ b} * L_{diff\ b} (6)$ | $MatIF_{amb\ b} * L_{amb\ b} (6)$ |
| $A_{12} \times B_{12}$ | g | RESERVED | $MatIF_{spec\ r} * L_{spec\ r} (6)$ |
| $A_{12} \times B_{12}$ | h | RESERVED | $MatIF_{spec\ g} * L_{spec\ g} (6)$ |
| $A_{12} \times B_{12}$ | i | RESERVED | $MatIF_{spec\ b} * L_{spec\ b} (6)$ |
| $A_{24} \times B_{12}$ | j | $N \bullet L(5) * Matl_{diff\ r} * L_{diff\ r} (5)$ | RESERVED |
| $A_{24} \times B_{12}$ | k | $N \bullet L(5) * Matl_{diff\ g} * L_{diff\ g} (5)$ | RESERVED |
| $A_{24} \times B_{12}$ | l | $N \bullet L(5) * Matl_{diff\ b} * L_{diff\ b} (5)$ | RESERVED |
| $A_{24} \times B_{12}$ | m | $N \bullet H_{LU}(3) * Matl_{spec\ r} * L_{spec\ r} (3)$ | $lookupvalueF(5) * invDeltaFront$ |
| $A_{24} \times B_{12}$ | n | $N \bullet H_{LU}(3) * Matl_{spec\ g} * L_{spec\ g} (3)$ | $N \bullet H_{LU}(4) = \{\{[\sim D_f(i_{f4})+1] + D_f(i_{f4}+1)\}*\alpha_{f4}\} + D_f(i_{f4})$ |
| $A_{24} \times B_{12}$ | o | $N \bullet H_{LU}(3) * Matl_{spec\ b} * L_{spec\ b} (3)$ | |
| $A_{16} + B_{16}$ | p | $[\sim D_f(i_{f4})+1] + D_f(i_{f4}+1)$ | $[\sim D_b(i_{b4})+1] + D_b(i_{b4}+1)$ |
| $A_{23} + B_{23}$ | q | $lookupvalueF(5) = N \bullet H(5) + cutoffFront$ | $lookupvalueB(5) = \overline{N \bullet H}(5) + cutoffBack$ |
| $A_{17} + B_{12} + C_{12}$ | red 1 | $C_{FADr} = C_{FADr} + MatIF_{amb\ r} * L_{amb\ r}(4) + N \bullet L(4) * MatIF_{diff\ r} * L_{diff\ r}(4)$ | $C_r = C_r + N \bullet H_{LU}(3) * Matl_{spec\ r} * L_{spec\ r}(3) + 0$ |
| $A_{17} + B_{12} + C_{12}$ | green 1 | $C_{FADg} = C_{FADg} + MatIF_{amb\ g} * L_{amb\ g}(4) + N \bullet L(4) * MatIF_{diff\ g} * L_{diff\ g}(4)$ | $C_g = C_g + N \bullet H_{LU}(3) * Matl_{spec\ g} * L_{spec\ g}(3) + 0$ |
| $A_{17} + B_{12} + C_{12}$ | blue 1 | $C_{FADb} = C_{FADb} + MatIF_{amb\ b} * L_{amb\ b}(4) + N \bullet L(4) * MatIF_{diff\ b} * L_{diff\ b}(4)$ | $C_b = C_b + N \bullet H_{LU}(3) * Matl_{spec\ b} * L_{spec\ b}(3) + 0$ |
| $A_{12} + B_{12} + C_{12}$ | red 2 | | |
| $A_{12} + B_{12} + C_{12}$ | green 2 | | |
| $A_{12} + B_{12} + C_{12}$ | blue 2 | | |

Fig. 4k

| Cycle | | 21 | 22 |
|---|---|---|---|
| $A_{24} \times B_{24}$ | a | $N \cdot H(6) * N \cdot L(6)$ | $N_x * L_x(7)$ |
| $A_{24} \times B_{24}$ | b | $N \cdot H(6) * N \cdot L(6)$ | $N_y * L_y(7)$ |
| $A_{24} \times B_{24}$ | c | $K(6) * 1.0$ | $N_z * L_z(7)$ |
| $A_{48} + B_{48} + C_{48}$ | abc | $E \cdot R(6) = (N \cdot H * N \cdot L) + (N \cdot H * N \cdot L) + K(6)$ | $N \cdot L(7) = N_x * L_x + N_y * L_y + N_z * L_z$ |
| $A_{12} \times B_{12}$ | d | $MatlB_{amb\,r} * L_{amb\,r}(6)$ | $MatlF_{diff\,r} * L_{diff\,r}(7)$ |
| $A_{12} \times B_{12}$ | e | $MatlB_{amb\,g} * L_{amb\,g}(6)$ | $MatlF_{diff\,g} * L_{diff\,g}(7)$ |
| $A_{12} \times B_{12}$ | f | $MatlB_{amb\,b} * L_{amb\,b}(6)$ | $MatlF_{diff\,b} * L_{diff\,b}(7)$ |
| $A_{12} \times B_{12}$ | g | $MatlB_{diff\,r} * L_{diff\,r}(6)$ | RESERVED |
| $A_{12} \times B_{12}$ | h | $MatlB_{diff\,g} * L_{diff\,g}(6)$ | RESERVED |
| $A_{12} \times B_{12}$ | i | $MatlB_{diff\,b} * L_{diff\,b}(6)$ | RESERVED |
| $A_{24} \times B_{12}$ | j | $MatlB_{spec\,r} * L_{spec\,r}(6)$ | $N \cdot L(6) * Matl_{diff\,r} * L_{diff\,r}(6)$ |
| $A_{24} \times B_{12}$ | k | $MatlB_{spec\,g} * L_{spec\,g}(6)$ | $N \cdot L(6) * Matl_{diff\,g} * L_{diff\,g}(6)$ |
| $A_{24} \times B_{12}$ | l | $MatlB_{spec\,b} * L_{spec\,b}(6)$ | $N \cdot L(6) * Matl_{diff\,b} * L_{diff\,b}(6)$ |
| $A_{24} \times B_{12}$ | m | $lookupvalueB(5) * invDeltaBack$ | $N \cdot H_{LU}(4) * Matl_{spec\,r} * L_{spec\,r}(4)$ |
| $A_{24} \times B_{12}$ | n | $\overline{N \cdot H_{LU}}(4) = \{\{[\sim D_b(i_{b4})+1] + D_b(i_{b4}+1)\} * \alpha_{b4}\} + D_b(i_{b4})\}$ | $N \cdot H_{LU}(4) * Matl_{spec\,g} * L_{spec\,g}(4)$ |
| $A_{24} \times B_{12}$ | o | | $N \cdot H_{LU}(4) * Matl_{spec\,b} * L_{spec\,b}(4)$ |
| $A_{16} + B_{16}$ | p | | $[\sim D_f(i_{f5})+1] + D_f(i_{f5}+1)$ |
| $A_{23} + B_{23}$ | q | | $lookupvalueF(6) = N \cdot H(6) + cutoffFront$ |
| $A_{17} + B_{12} + C_{12}$ | red 1 | $C_{BADr} = C_{BADr} + MatlB_{amb\,r} * L_{amb\,r}(5) + \overline{N \cdot L}(5) * MatlB_{diff\,r} * L_{diff\,r}(5)$ | $C_{FADr} = C_{FADr} + MatlF_{amb\,r} * L_{amb\,r}(5) + N \cdot L(5) * MatlF_{diff\,r} * L_{diff\,r}(5)$ |
| $A_{17} + B_{12} + C_{12}$ | green 1 | $C_{BADg} = C_{BADg} + MatlB_{amb\,g} * L_{amb\,g}(5) + \overline{N \cdot L}(5) * MatlB_{diff\,g} * L_{diff\,g}(5)$ | $C_{FADg} = C_{FADg} + MatlF_{amb\,g} * L_{amb\,g}(5) + N \cdot L(5) * MatlF_{diff\,g} * L_{diff\,g}(5)$ |
| $A_{17} + B_{12} + C_{12}$ | blue 1 | $C_{BADb} = C_{BADb} + MatlB_{amb\,b} * L_{amb\,b}(5) + \overline{N \cdot L}(5) * MatlB_{diff\,b} * L_{diff\,b}(5)$ | $C_{FADb} = C_{FADb} + MatlF_{amb\,b} * L_{amb\,b}(5) + N \cdot L(5) * MatlF_{diff\,b} * L_{diff\,b}(5)$ |
| $A_{12} + B_{12} + C_{12}$ | red 2 | | |
| $A_{12} + B_{12} + C_{12}$ | green 2 | | |
| $A_{12} + B_{12} + C_{12}$ | blue 2 | | |

Fig. 4C

| Cycle | | 23 | 24 |
|---|---|---|---|
| $A_{24} \times B_{24}$ | a | $N_x * H_x^{(7)}$ | $N \cdot H^{(7)} * N \cdot L^{(7)}$ |
| $A_{24} \times B_{24}$ | b | $N_y * H_y^{(7)}$ | $N \cdot H^{(7)} * N \cdot L^{(7)}$ |
| $A_{24} \times B_{24}$ | c | $N_z * H_z^{(7)}$ | $K^{(7)} * 1.0$ |
| $A_{48} + B_{48} + C_{48}$ | abc | $N \cdot H^{(7)} = N_x * H_x + N_y * H_y + N_z * H_z$ | $E \cdot R^{(7)} = (N \cdot H * N \cdot L) + (N \cdot H * N \cdot L) + K^{(7)}$ |
| $A_{12} \times B_{12}$ | d | $MatlF_{amb\,r} * L_{amb\,r}^{(7)}$ | $MatlB_{amb\,r} * L_{amb\,r}^{(7)}$ |
| $A_{12} \times B_{12}$ | e | $MatlF_{amb\,g} * L_{amb\,g}^{(7)}$ | $MatlB_{amb\,g} * L_{amb\,g}^{(7)}$ |
| $A_{12} \times B_{12}$ | f | $MatlF_{amb\,b} * L_{amb\,b}^{(7)}$ | $MatlB_{amb\,b} * L_{amb\,b}^{(7)}$ |
| $A_{12} \times B_{12}$ | g | $MatlF_{spec\,r} * L_{spec\,r}^{(7)}$ | $MatlB_{diff\,r} * L_{diff\,r}^{(7)}$ |
| $A_{12} \times B_{12}$ | h | $MatlF_{spec\,g} * L_{spec\,g}^{(7)}$ | $MatlB_{diff\,g} * L_{diff\,g}^{(7)}$ |
| $A_{12} \times B_{12}$ | i | $MatlF_{spec\,b} * L_{spec\,b}^{(7)}$ | $MatlB_{diff\,b} * L_{diff\,b}^{(7)}$ |
| $A_{24} \times B_{12}$ | j | RESERVED | $MatlB_{spec\,r} * L_{spec\,r}^{(7)}$ |
| $A_{24} \times B_{12}$ | k | RESERVED | $MatlB_{spec\,g} * L_{spec\,g}^{(7)}$ |
| $A_{24} \times B_{12}$ | l | RESERVED | $MatlB_{spec\,b} * L_{spec\,b}^{(7)}$ |
| $A_{24} \times B_{12}$ | m | lookupvalueF(6) * invDeltaFront | lookupvalueB(6) * invDeltaBack |
| $A_{24} \times B_{12}$ | n | $N \cdot H_{LU}^{(5)} = \{\{[\sim D_f(i_{f5})+1] + D_f(i_{f5}+1)\} * \alpha_{f5}\} + D_f(i_{f5})$ | $\overline{N \cdot H}_{LU}^{(5)} = \{\{[\sim D_b(i_{b5})+1] + D_b(i_{b5}+1)\} * \alpha_{b5}\} + D_b(i_{b5})$ |
| $A_{24} \times B_{12}$ | o | | |
| $A_{16} + B_{16}$ | p | $[\sim D_b(i_{b5})+1] + D_b(i_{b5}+1)$ | |
| $A_{23} + B_{23}$ | q | lookupvalueB(6) = $\overline{N \cdot H}^{(6)}$ + cutoffBack | |
| $A_{17} + B_{12} + C_{12}$ | red 1 | $C_r = C_r +$ $N \cdot H_{LU}^{(4)} * Matl_{spec\,r} * L_{spec\,r}^{(4)} +$ 0 | $C_{BADr} = C_{BADr} +$ $MatlB_{amb\,r} * L_{amb\,r}^{(6)} +$ $\overline{N \cdot L}^{(6)} * MatlB_{diff\,r} * L_{diff\,r}^{(6)}$ |
| $A_{17} + B_{12} + C_{12}$ | green 1 | $C_g = C_g +$ $N \cdot H_{LU}^{(4)} * Matl_{spec\,g} * L_{spec\,g}^{(4)} +$ 0 | $C_{BADg} = C_{BADg} +$ $MatlB_{amb\,g} * L_{amb\,g}^{(6)} +$ $\overline{N \cdot L}^{(6)} * MatlB_{diff\,g} * L_{diff\,g}^{(6)}$ |
| $A_{17} + B_{12} + C_{12}$ | blue 1 | $C_b = C_b +$ $N \cdot H_{LU}^{(4)} * Matl_{spec\,b} * L_{spec\,b}^{(4)} +$ 0 | $C_{BADb} = C_{BADb} +$ $MatlB_{amb\,b} * L_{amb\,b}^{(6)} +$ $\overline{N \cdot L}^{(6)} * MatlB_{diff\,b} * L_{diff\,b}^{(6)}$ |
| $A_{12} + B_{12} + C_{12}$ | red 2 | | |
| $A_{12} + B_{12} + C_{12}$ | green 2 | | |
| $A_{12} + B_{12} + C_{12}$ | blue 2 | | |

Fig. 4m

| Cycle | | 25 | 26 |
|---|---|---|---|
| $A_{24} \times B_{24}$ | a | $N_x * L_x(0)$ | $N_x * H_x(0)$ |
| $A_{24} \times B_{24}$ | b | $N_y * L_y(0)$ | $N_y * H_y(0)$ |
| $A_{24} \times B_{24}$ | c | $N_z * L_z(0)$ | $N_z * H_z(0)$ |
| $A_{48} + B_{48} + C_{48}$ | abc | $N \cdot L(0) = N_x*L_x + N_y*L_y + N_z*L_z$ | $N \cdot H(0) = N_x*H_x + N_y*H_y + N_z*H_z$ |
| $A_{12} \times B_{12}$ | d | $MatlF_{diff\ r} * L_{diff\ r}(0)$ | $MatlF_{amb\ r} * L_{amb\ r}(0)$ |
| $A_{12} \times B_{12}$ | e | $MatlF_{diff\ g} * L_{diff\ g}(0)$ | $MatlF_{amb\ g} * L_{amb\ g}(0)$ |
| $A_{12} \times B_{12}$ | f | $MatlF_{diff\ b} * L_{diff\ b}(0)$ | $MatlF_{amb\ b} * L_{amb\ b}(0)$ |
| $A_{12} \times B_{12}$ | g | $MatlF_{amb\ r} * Model_{amb\ r}$ | $MatlF_{spec\ r} * L_{spec\ r}(0)$ |
| $A_{12} \times B_{12}$ | h | $MatlF_{amb\ g} * Model_{amb\ g}$ | $MatlF_{spec\ g} * L_{spec\ g}(0)$ |
| $A_{12} \times B_{12}$ | i | $MatlF_{amb\ b} * Model_{amb\ b}$ | $MatlF_{spec\ b} * L_{spec\ b}(0)$ |
| $A_{24} \times B_{12}$ | j | $N \cdot L(7) * Matl_{diff\ r} * L_{diff\ r}(7)$ | $MatlB_{amb\ r} * Model_{amb\ r}$ |
| $A_{24} \times B_{12}$ | k | $N \cdot L(7) * Matl_{diff\ g} * L_{diff\ g}(7)$ | $MatlB_{amb\ g} * Model_{amb\ g}$ |
| $A_{24} \times B_{12}$ | l | $N \cdot L(7) * Matl_{diff\ b} * L_{diff\ b}(7)$ | $MatlB_{amb\ b} * Model_{amb\ b}$ |
| $A_{24} \times B_{12}$ | m | $N \cdot H_{LU}(5) * Matl_{spec\ r} * L_{spec\ r}(5)$ | lookupvalueF(7) * invDeltaFront |
| $A_{24} \times B_{12}$ | n | $N \cdot H_{LU}(5) * Matl_{spec\ g} * L_{spec\ g}(5)$ | $N \cdot H_{LU}(6) = \{\{[\sim D_f(i_{f6})+1] + D_f(i_{f6}+1)\}*\alpha_{f6}\} + D_f[i_{f6}]$ |
| $A_{24} \times B_{12}$ | o | $N \cdot H_{LU}(5) * Matl_{spec\ b} * L_{spec\ b}(5)$ | |
| $A_{16} + B_{16}$ | p | $[\sim D_f(i_{f6})+1] + D_f(i_{f6}+1)$ | $[\sim D_b(i_{b6})+1] + D_b(i_{b6}+1)$ |
| $A_{23} + B_{23}$ | q | lookupvalueF(7) = $N \cdot H(7)$ + cutoffFront | lookupvalueB(7) = $\overline{N \cdot H}(7)$ + cutoffBack |
| $A_{17} + B_{12} + C_{12}$ | red 1 | $C_{FADr} = C_{FADr} + MatlF_{amb\ r} * L_{amb\ r}(6) + N \cdot L(6) * MatlF_{diff\ r} * L_{diff\ r}(6)$ | $C_r = C_r + N \cdot H_{LU}(5) * Matl_{spec\ r} * L_{spec\ r}(5) + 0$ |
| $A_{17} + B_{12} + C_{12}$ | green 1 | $C_{FADg} = C_{FADg} + MatlF_{amb\ g} * L_{amb\ g}(6) + N \cdot L(6) * MatlF_{diff\ g} * L_{diff\ g}(6)$ | $C_g = C_g + N \cdot H_{LU}(5) * Matl_{spec\ g} * L_{spec\ g}(5) + 0$ |
| $A_{17} + B_{12} + C_{12}$ | blue 1 | $C_{FADb} = C_{FADb} + MatlF_{amb\ b} * L_{amb\ b}(6) + N \cdot L(6) * MatlF_{diff\ b} * L_{diff\ b}(6)$ | $C_b = C_b + N \cdot H_{LU}(5) * Matl_{spec\ b} * L_{spec\ b}(5) + 0$ |
| $A_{12} + B_{12} + C_{12}$ | red 2 | | $C_{FADr} = FAD_R + MatlF_{emis\ r} + MatlF_{amb\ r} * Model_{amb\ r}$ |
| $A_{12} + B_{12} + C_{12}$ | green 2 | | $C_{FADg} = FAD_G + MatlF_{emis\ g} + MatlF_{amb\ g} * Model_{amb\ g}$ |
| $A_{12} + B_{12} + C_{12}$ | blue 2 | | $C_{FADb} = FAD_B + MatlF_{emis\ b} + MatlF_{amb\ b} * Model_{amb\ b}$ |

Fig. 4n

| Cycle | | 27 | 28 |
|---|---|---|---|
| $A_{24} \times B_{24}$ | a | $N \cdot H(0) * N \cdot L(0)$ | $N_x * L_x(1)$ |
| $A_{24} \times B_{24}$ | b | $N \cdot H(0) * N \cdot L(0)$ | $N_y * L_y(1)$ |
| $A_{24} \times B_{24}$ | c | $K(0) * 1.0$ | $N_z * L_z(1)$ |
| $A_{48} + B_{48} + C_{48}$ | abc | $E \cdot R(0) = (N \cdot H * N \cdot L) + (N \cdot H * N \cdot L) + K(0)$ | $N \cdot L(1) = N_x * L_x + N_y * L_y + N_z * L_z$ |
| $A_{12} \times B_{12}$ | d | $MatIB_{amb\ r} * L_{amb\ r}(0)$ | $MatIF_{diff\ r} * L_{diff\ r}(1)$ |
| $A_{12} \times B_{12}$ | e | $MatIB_{amb\ g} * L_{amb\ g}(0)$ | $MatIF_{diff\ g} * L_{diff\ g}(1)$ |
| $A_{12} \times B_{12}$ | f | $MatIB_{amb\ b} * L_{amb\ b}(0)$ | $MatIF_{diff\ b} * L_{diff\ b}(1)$ |
| $A_{12} \times B_{12}$ | g | $MatIB_{diff\ r} * L_{diff\ r}(0)$ | RESERVED |
| $A_{12} \times B_{12}$ | h | $MatIB_{diff\ g} * L_{diff\ g}(0)$ | RESERVED |
| $A_{12} \times B_{12}$ | i | $MatIB_{diff\ b} * L_{diff\ b}(0)$ | RESERVED |
| $A_{24} \times B_{12}$ | j | $MatIB_{spec\ r} * L_{spec\ r}(0)$ | $N \cdot L(0) * MatI_{diff\ r} * L_{diff\ r}(0)$ |
| $A_{24} \times B_{12}$ | k | $MatIB_{spec\ g} * L_{spec\ g}(0)$ | $N \cdot L(0) * MatI_{diff\ g} * L_{diff\ g}(0)$ |
| $A_{24} \times B_{12}$ | l | $MatIB_{spec\ b} * L_{spec\ b}(0)$ | $N \cdot L(0) * MatI_{diff\ b} * L_{diff\ b}(0)$ |
| $A_{24} \times B_{12}$ | m | $lookupvalueB(7) * invDeltaBack$ | $N \cdot H_{LU}(6) * MatI_{spec\ r} * L_{spec\ r}(6)$ |
| $A_{24} \times B_{12}$ | n | $\overline{N \cdot H_{LU}(6)} = \{\{[\sim D_b(i_{b6})+1] + D_b(i_{b6}+1)\} * \alpha_{b6}\} + D_b[i_{b6}]$ | $N \cdot H_{LU}(6) * MatI_{spec\ g} * L_{spec\ g}(6)$ |
| $A_{24} \times B_{12}$ | o | | $N \cdot H_{LU}(6) * MatI_{spec\ b} * L_{spec\ b}(6)$ |
| $A_{16} + B_{16}$ | p | | $[\sim D_f(i_{f7})+1] + D_f(i_{f7}+1)$ |
| $A_{23} + B_{23}$ | q | | $lookupvalueF(0) = N \cdot H(0) + cutoffFront$ |
| $A_{17} + B_{12} + C_{12}$ | red 1 | $C_{BADr} = C_{BADr} + MatIB_{amb\ r} * L_{amb\ r}(7) + \overline{N \cdot L(7)} * MatIB_{diff\ r} * L_{diff\ r}(7)$ | $C_{FADr} = C_{FADr} + MatIF_{amb\ r} * L_{amb\ r}(7) + N \cdot L(7) * MatIF_{diff\ r} * L_{diff\ r}(7)$ |
| $A_{17} + B_{12} + C_{12}$ | green 1 | $C_{BADg} = C_{BADg} + MatIB_{amb\ g} * L_{amb\ g}(7) + \overline{N \cdot L(7)} * MatIB_{diff\ g} * L_{diff\ g}(7)$ | $C_{FADg} = C_{FADg} + MatIF_{amb\ g} * L_{amb\ g}(7) + N \cdot L(7) * MatIF_{diff\ g} * L_{diff\ g}(7)$ |
| $A_{17} + B_{12} + C_{12}$ | blue 1 | $C_{BADb} = C_{BADb} + MatIB_{amb\ b} * L_{amb\ b}(7) + \overline{N \cdot L(7)} * MatIB_{diff\ b} * L_{diff\ b}(7)$ | $C_{FADb} = C_{FADb} + MatIF_{amb\ b} * L_{amb\ b}(7) + N \cdot L(7) * MatIF_{diff\ b} * L_{diff\ b}(7)$ |
| $A_{12} + B_{12} + C_{12}$ | red 2 | $C_{BADr} = BAD_R + MatIB_{emis\ r} + MatIB_{amb\ r} * Model_{amb\ r}$ | |
| $A_{12} + B_{12} + C_{12}$ | green 2 | $C_{BADg} = BAD_G + MatIB_{emis\ g} + MatIB_{amb\ g} * Model_{amb\ g}$ | |
| $A_{12} + B_{12} + C_{12}$ | blue 2 | $C_{BADb} = BAD_B + MatIB_{emis\ b} + MatIB_{amb\ b} * Model_{amb\ b}$ | |

Fig. 4o

| Cycle | | 29 | 30 |
|---|---|---|---|
| $A_{24} \times B_{24}$ | a | $N_x * H_x(1)$ | $N \cdot H(1) * N \cdot L(1)$ |
| $A_{24} \times B_{24}$ | b | $N_y * H_y(1)$ | $N \cdot H(1) * N \cdot L(1)$ |
| $A_{24} \times B_{24}$ | c | $N_z * H_z(1)$ | $K(1) * 1.0$ |
| $A_{48} + B_{48} + C_{48}$ | abc | $N \cdot H(1) = N_x * H_x + N_y * H_y + N_z * H_z$ | $E \cdot R(1) = (N \cdot H * N \cdot L) + (N \cdot H * N \cdot L) + K(1)$ |
| $A_{12} \times B_{12}$ | d | $MatlF_{amb\ r} * L_{amb\ r}(1)$ | $MatlB_{amb\ r} * L_{amb\ r}(1)$ |
| $A_{12} \times B_{12}$ | e | $MatlF_{amb\ g} * L_{amb\ g}(1)$ | $MatlB_{amb\ g} * L_{amb\ g}(1)$ |
| $A_{12} \times B_{12}$ | f | $MatlF_{amb\ b} * L_{amb\ b}(1)$ | $MatlB_{amb\ b} * L_{amb\ b}(1)$ |
| $A_{12} \times B_{12}$ | g | $MatlF_{spec\ r} * L_{spec\ r}(1)$ | $MatlB_{diff\ r} * L_{diff\ r}(1)$ |
| $A_{12} \times B_{12}$ | h | $MatlF_{spec\ g} * L_{spec\ g}(1)$ | $MatlB_{diff\ g} * L_{diff\ g}(1)$ |
| $A_{12} \times B_{12}$ | i | $MatlF_{spec\ b} * L_{spec\ b}(1)$ | $MatlB_{diff\ b} * L_{diff\ b}(1)$ |
| $A_{24} \times B_{12}$ | j | RESERVED | $MatlB_{spec\ r} * L_{spec\ r}(1)$ |
| $A_{24} \times B_{12}$ | k | RESERVED | $MatlB_{spec\ g} * L_{spec\ g}(1)$ |
| $A_{24} \times B_{12}$ | l | RESERVED | $MatlB_{spec\ b} * L_{spec\ b}(1)$ |
| $A_{24} \times B_{12}$ | m | lookupvalueF(0) * invDeltaFront | lookupvalueB(0) * invDeltaBack |
| $A_{24} \times B_{12}$ | n | $N \cdot H_{LU}(7) = \{\{[\sim D_f(i_{f7})+1] + D_f(i_{f7}+1)\} * \alpha_{f7}\} + D_f(i_{f7})$ | $\overline{N \cdot H}_{LU}(7) = \{\{[\sim D_b(i_{b7})+1] + D_b(i_{b7}+1)\} * \alpha_{b7}\} + D_b(i_{b7})$ |
| $A_{24} \times B_{12}$ | o | | |
| $A_{16} + B_{16}$ | p | $[\sim D_b(i_{b7})+1] + D_b(i_{b7}+1)$ | |
| $A_{23} + B_{23}$ | q | lookupvalueB(0) = $\overline{N \cdot H}(0)$ + cutoffBack | |
| $A_{17} + B_{12} + C_{12}$ | red 1 | $C_r = C_r + N \cdot H_{LU}(6) * Matl_{spec\ r} * L_{spec\ r}(6) + 0$ | $C_{BADr} = C_{BADr} + MatlB_{amb\ r} * L_{amb\ r}(0) + \overline{N \cdot L}(0) * MatlB_{diff\ r} * L_{diff\ r}(0)$ |
| $A_{17} + B_{12} + C_{12}$ | green 1 | $C_g = C_g + N \cdot H_{LU}(6) * Matl_{spec\ g} * L_{spec\ g}(6) + 0$ | $C_{BADg} = C_{BADg} + MatlB_{amb\ g} * L_{amb\ g}(0) + \overline{N \cdot L}(0) * MatlB_{diff\ g} * L_{diff\ g}(0)$ |
| $A_{17} + B_{12} + C_{12}$ | blue 1 | $C_b = C_b + N \cdot H_{LU}(6) * Matl_{spec\ b} * L_{spec\ b}(6) + 0$ | $C_{BADb} = C_{BADb} + MatlB_{amb\ b} * L_{amb\ b}(0) + \overline{N \cdot L}(0) * MatlB_{diff\ b} * L_{diff\ b}(0)$ |
| $A_{12} + B_{12} + C_{12}$ | red 2 | | |
| $A_{12} + B_{12} + C_{12}$ | green 2 | | |
| $A_{12} + B_{12} + C_{12}$ | blue 2 | | |

Fig. 4p

| Cycle | | 31 | 32 |
|---|---|---|---|
| $A_{24} \times B_{24}$ | a | $N_x * L_x(2)$ | $N_x * H_x(2)$ |
| $A_{24} \times B_{24}$ | b | $N_y * L_y(2)$ | $N_y * H_y(2)$ |
| $A_{24} \times B_{24}$ | c | $N_z * L_z(2)$ | $N_z * H_z(2)$ |
| $A_{48} + B_{48} + C_{48}$ | abc | $N \cdot L(2) = N_x * L_x + N_y * L_y + N_z * L_z$ | $N \cdot H(1) = N_x * H_x + N_y * H_y + N_z * H_z$ |
| $A_{12} \times B_{12}$ | d | $MatlF_{diff\ r} * L_{diff\ r}(2)$ | $MatlF_{amb\ r} * L_{amb\ r}(2)$ |
| $A_{12} \times B_{12}$ | e | $MatlF_{diff\ g} * L_{diff\ g}(2)$ | $MatlF_{amb\ g} * L_{amb\ g}(2)$ |
| $A_{12} \times B_{12}$ | f | $MatlF_{diff\ b} * L_{diff\ b}(2)$ | $MatlF_{amb\ b} * L_{amb\ b}(2)$ |
| $A_{12} \times B_{12}$ | g | RESERVED | $MatlF_{spec\ r} * L_{spec\ r}(2)$ |
| $A_{12} \times B_{12}$ | h | RESERVED | $MatlF_{spec\ g} * L_{spec\ g}(2)$ |
| $A_{12} \times B_{12}$ | i | RESERVED | $MatlF_{spec\ b} * L_{spec\ b}(2)$ |
| $A_{24} \times B_{12}$ | j | $N \cdot L(1) * Matl_{diff\ r} * L_{diff\ r}(1)$ | RESERVED |
| $A_{24} \times B_{12}$ | k | $N \cdot L(1) * Matl_{diff\ g} * L_{diff\ g}(1)$ | RESERVED |
| $A_{24} \times B_{12}$ | l | $N \cdot L(1) * Matl_{diff\ b} * L_{diff\ b}(1)$ | RESERVED |
| $A_{24} \times B_{12}$ | m | $N \cdot H_{LU}(7) * Matl_{spec\ r} * L_{spec\ r}(7)$ | lookupvalueF(1) * invDeltaFront |
| $A_{24} \times B_{12}$ | n | $N \cdot H_{LU}(7) * Matl_{spec\ g} * L_{spec\ g}(7)$ | $N \cdot H_{LU}(0) = \{\{[\sim D_f(i_{f0})+1] + D_f(i_{f0}+1)\} * \alpha_{f0}\} + D_f(i_{f0})$ |
| $A_{24} \times B_{12}$ | o | $N \cdot H_{LU}(7) * Matl_{spec\ b} * L_{spec\ b}(7)$ | |
| $A_{16} + B_{16}$ | p | $[\sim D_f(i_{f0})+1] + D_f(i_{f0}+1)$ | $[\sim D_b(i_{b0})+1] + D_b(i_{b0}+1)$ |
| $A_{23} + B_{23}$ | q | lookupvalueF(1) = $N \cdot H(1)$ + cutoffFront | lookupvalueB(1) = $N \cdot H(1)$ + cutoffBack |
| $A_{17} + B_{12} + C_{12}$ | red 1 | $C_{FADr} = C_{FADr} + MatlF_{amb\ r} * L_{amb\ r}(0) + N \cdot L(0) * MatlF_{diff\ r} * L_{diff\ r}(0)$ | $C_r = C_r + N \cdot H_{LU}(7) * Matl_{spec\ r} * L_{spec\ r}(7) + 0$ |
| $A_{17} + B_{12} + C_{12}$ | green 1 | $C_{FADg} = C_{FADg} + MatlF_{amb\ g} * L_{amb\ g}(0) + N \cdot L(0) * MatlF_{diff\ g} * L_{diff\ g}(0)$ | $C_g = C_g + N \cdot H_{LU}(7) * Matl_{spec\ g} * L_{spec\ g}(7) + 0$ |
| $A_{17} + B_{12} + C_{12}$ | blue 1 | $C_{FADb} = C_{FADb} + MatlF_{amb\ b} * L_{amb\ b}(0) + N \cdot L(0) * MatlF_{diff\ b} * L_{diff\ b}(0)$ | $C_b = C_b + N \cdot H_{LU}(7) * Matl_{spec\ b} * L_{spec\ b}(7) + 0$ |
| $A_{12} + B_{12} + C_{12}$ | red 2 | | |
| $A_{12} + B_{12} + C_{12}$ | green 2 | | |
| $A_{12} + B_{12} + C_{12}$ | blue 2 | | |

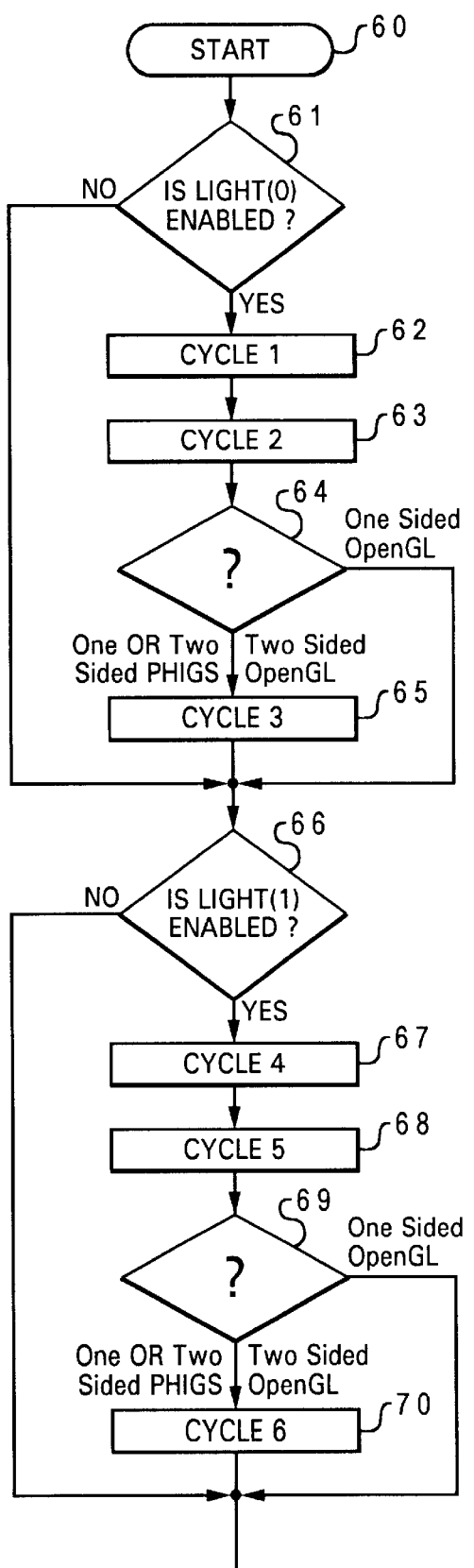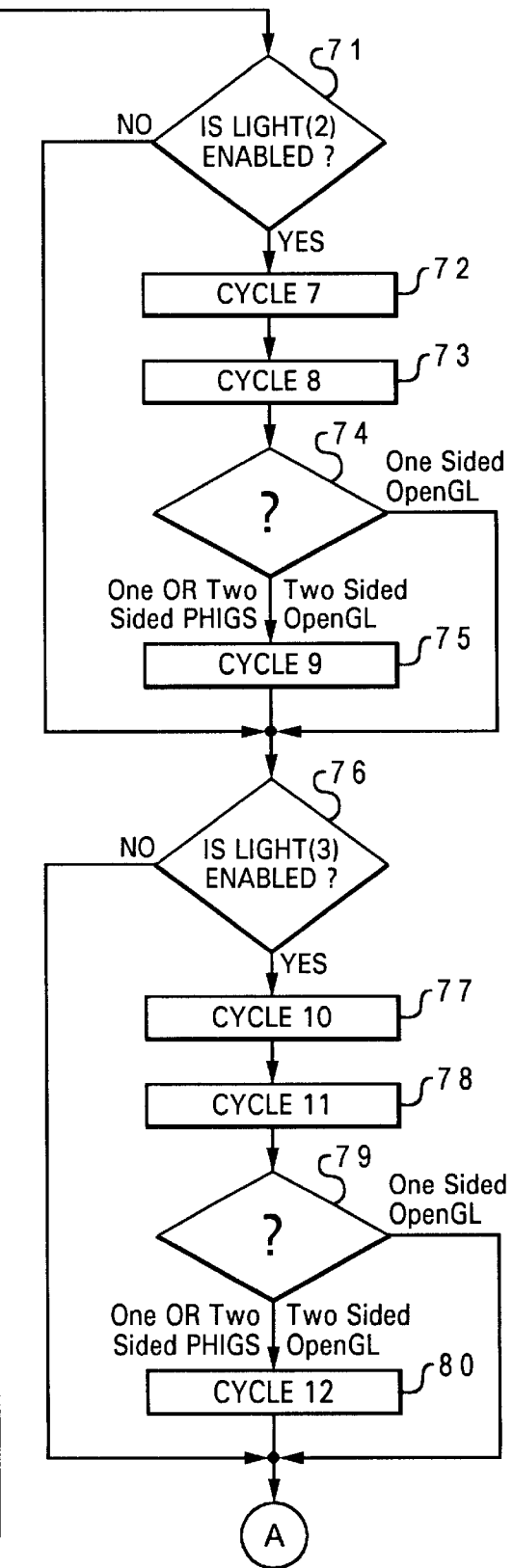
Fig. 5a

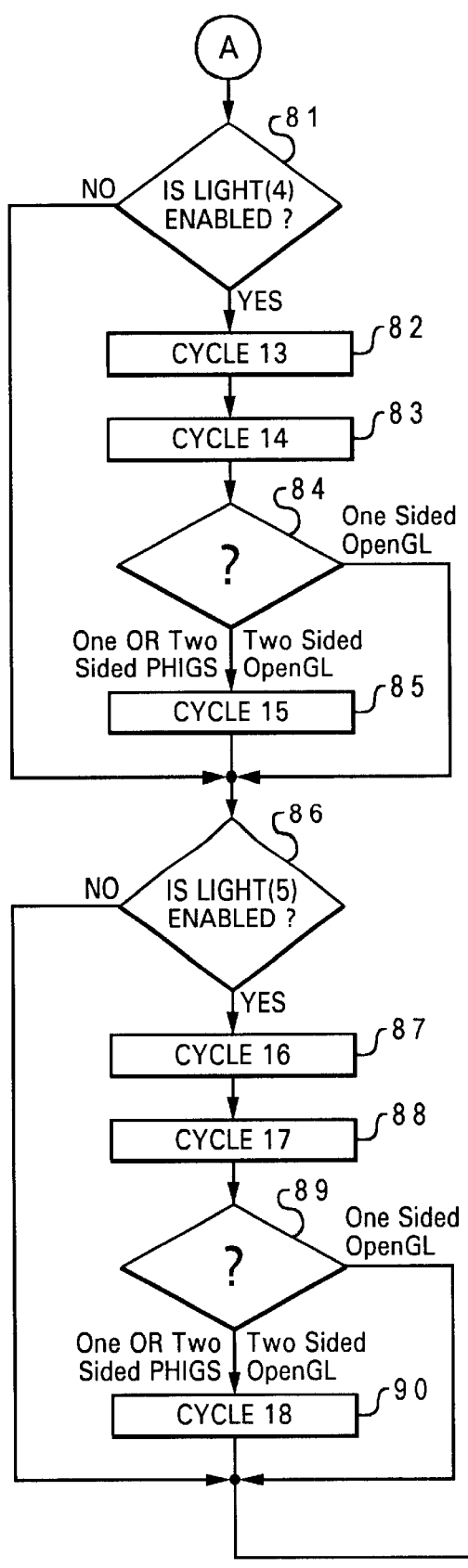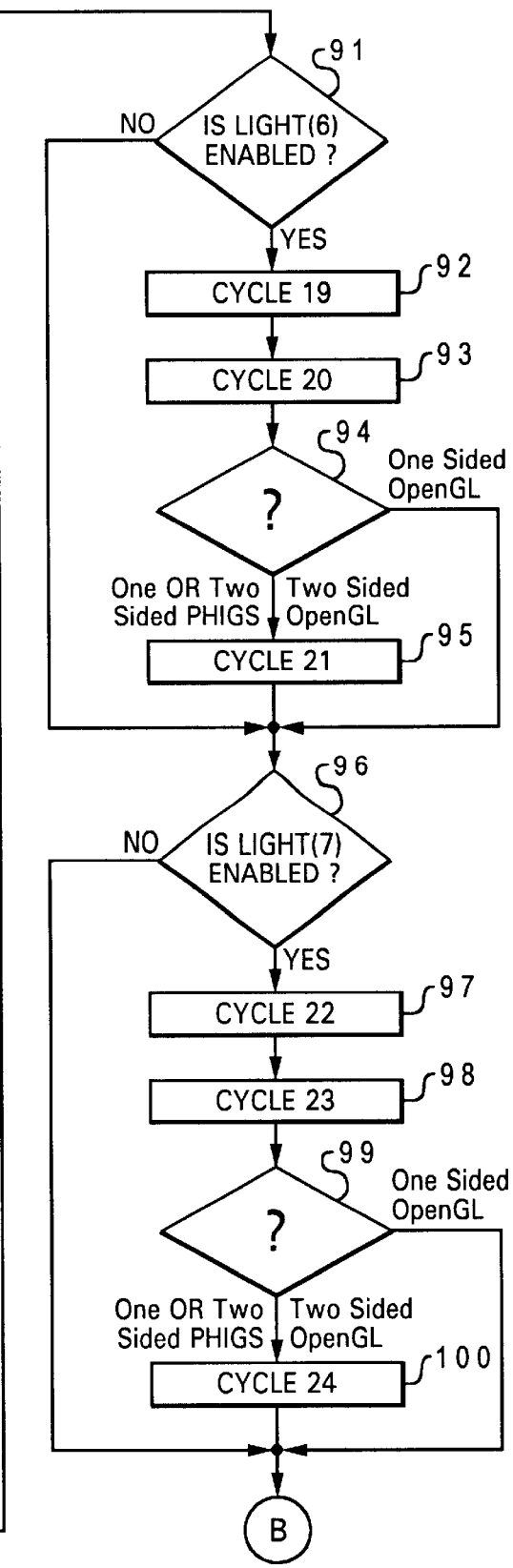
Fig. 56

GRAPHICS ADAPTER HAVING A VERSATILE LIGHTING ENGINE

RELATED PATENT APPLICATION

The present patent application is related to a copending application U.S. Ser. No. 09/165,084 filed on even date, entitled "A GRAPHICS ADAPTER CAPABLE OF SUPPORTING LIGHTING MODELS FROM MULTIPLE APPLICATION PROGRAMMING INTERFACES WITHIN A GRAPHICS SYSTEM" the pertinent portion of which is incorporated by reference herein.

BACKGROUND OF THE INVENTION

1. Technical Field

The present invention relates to an apparatus for graphics processing in general, and in particular to an apparatus for generating graphics images within a graphics system. Still more particularly, the present invention relates to a graphics adapter having a versatile lighting engine.

2. Description of the Prior Art

Three-dimensional (3-D) graphics scenes in a graphics system are typically made up of a number of polygons that are delimited by a set of vertices. Several vertices can be combined to form a primitive such as a square, a triangle, etc. Each individual vertex owns a set of attributes, such as: 1) a material color, which describes the color of an object to which the vertex belongs; 2) a normal, which describes the direction a surface is facing at that vertex; and 3) a position, which describes where the vertex is located. In addition, each graphics scene also has a set of attributes, such as: 1) an ambient light intensity; and 2) location and intensity of one or more individual light sources. One important task of a 3-D graphics system is to combine the vertex information that describes a surface (i.e., the material color, the normal, and the position) with the scene information (i.e., the ambient light intensity and the location and intensity of all light sources) in order to produce a color for an object that accurately portrays the appearance of the object.

When the attributes of all light sources and surfaces are known, the color of the object can be evaluated utilizing a lighting equation. With a lighting equation, colors of an object are generally computed on a vertex-by-vertex basis. Generally speaking, there are four components that contribute to the full lit color of a vertex, namely, emissive, ambient, diffuse, and specular.

A surface is assumed to emit light of a given color that radiates in all directions, if the material associated with the surface has an emissive component assigned to it. The contribution to the intensity at a vertex is the emissive component. Thus, the emissive component is generally utilized to model surfaces that give off light.

Ambient is a component of light whose reflection is constant off of all surfaces, regardless of the viewpoint or light source direction. Each graphics scene has an ambient color. The brightness of an image due to ambient light is determined by the ambient color of the graphics scene, the ambient intensity of each light source, and the ambient material color of the object.

Diffuse is the contribution of light that is reflected and scattered in all directions by an object, independent of the viewing direction.

Specular reflection has its brightest intensity along the direction of reflection. For example, a shiny surface such as a mirror or a steel ball will generate a very bright reflection, but only when viewed along the direction of reflection or close to it.

All four above-mentioned color components may be utilized during the computation of a lit color of a vertex. The present invention provides a graphics adapter having a versatile lighting engine that is capable of processing each vertex of a graphical object in an efficient manner.

SUMMARY OF THE INVENTION

In accordance with a preferred embodiment of the present invention, graphics objects in a graphics scene can be generated by a graphics adapter. Each of the graphics objects within the graphics scene is made up of a number of polygons that are delimited by a set of vertices. The graphics adapter includes a graphics pipeline and a control module. In response to attributes received from a graphics software application, the control module selectively controls a frequency in which vertices are fed into the graphics pipeline and controls a number of concurrent calculations that are performed on the vertices within the graphics pipeline.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIG. 3 is a functional block diagram of the lighting unit from FIG. 2, in accordance with a preferred embodiment of the present invention;

FIGS. 4*a*–4*p* are tables illustrating how the graphics pipeline from FIG. 3 concurrently processes vertices of a graphics object, in accordance with a preferred embodiment of the present invention; and FIGS. 5*a*–5*c* are high-level logic flow diagrams depicting how the control module and the graphics pipeline from FIG. 3 concurrently processes vertices of a graphics object, in accordance with a preferred embodiment of the present invention.

DETAILED DESCRIPTION OF A PREFERRED EMBODIMENT

Figure 1:
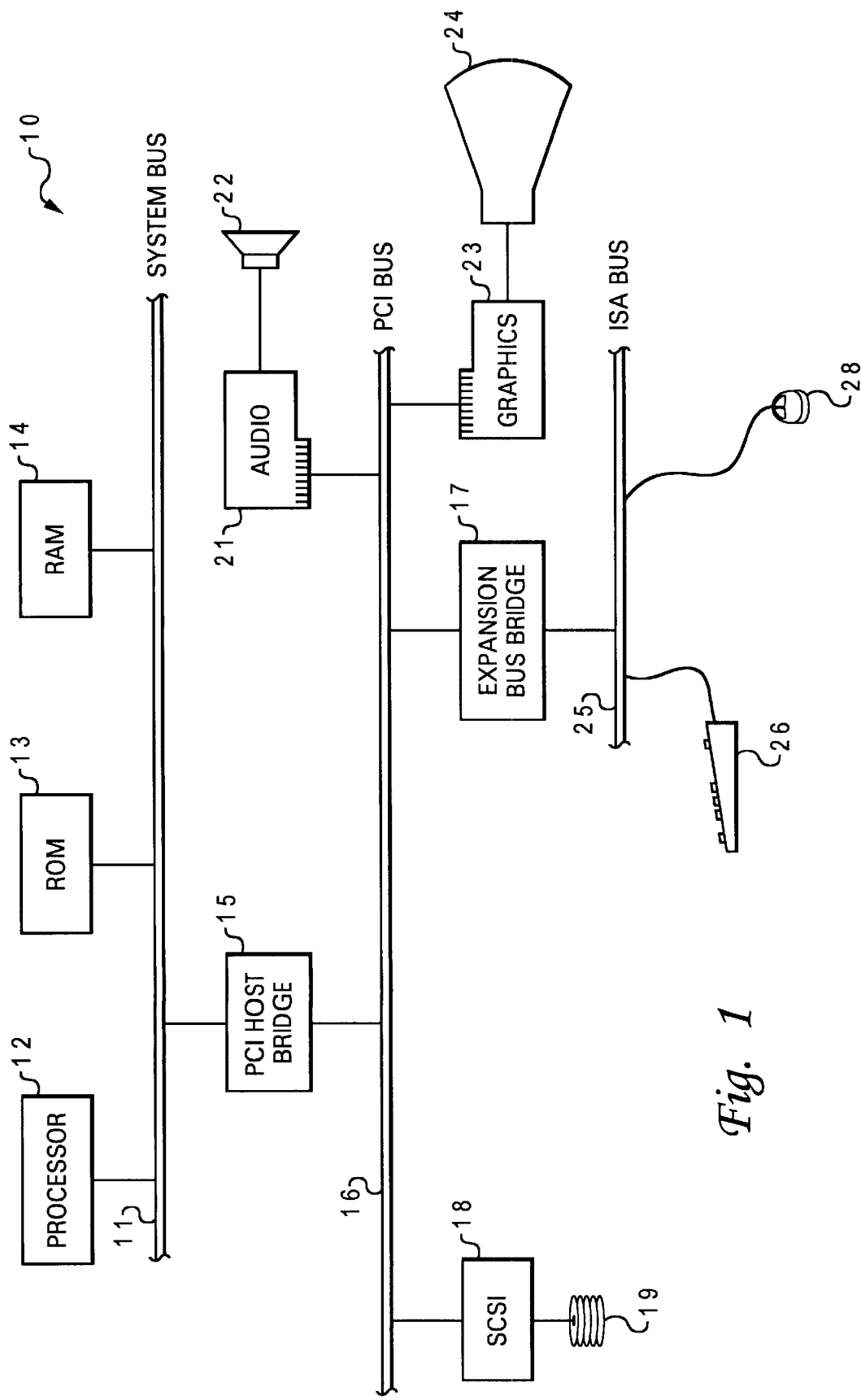
FIG. 1 is a block diagram of a graphics system in which a preferred embodiment of the present invention may be incorporated.

Referring now to the drawings and specifically to FIG. 1, there is illustrated a block diagram of a graphics system in which a preferred embodiment of the present invention may be incorporated. As shown, a processor 12, a read-only memory (ROM) 13, and a Random Access Memory (RAM) 14 are connected to a system bus 11 of a graphics system 10. Processor 12, ROM 13, and RAM 14 are also coupled to a PCI bus 16 of graphics system 10 through a PCI host bridge 15. PCI host bridge 15 provides a low latency path through which CPU 12 may directly access PCI devices mapped anywhere within bus memory and/or I/O address spaces. PCI host bridge 15 also provides a high bandwidth path allowing PCI devices to directly access RAM 14.

Also attached to PCI bus 16 is a small computer system interface (SCSI) 18 that is utilized to control a high-speed SCSI disk drive 19. Expansion bus bridge 17, such as a PCI-to-ISA bus bridge, may be utilized for coupling an ISA bus 25 to PCI bus 16. A keyboard 26 and a mouse 28 may be attached to ISA bus 25 for performing certain basic I/O functions. In addition, an audio adapter 21 and a graphics adapter 23 may be attached to PCI bus 16. Audio adapter 21 controls audio output through a speaker 22 and graphics adapter 23 controls visual output through a graphics display 24.

Figure 2:
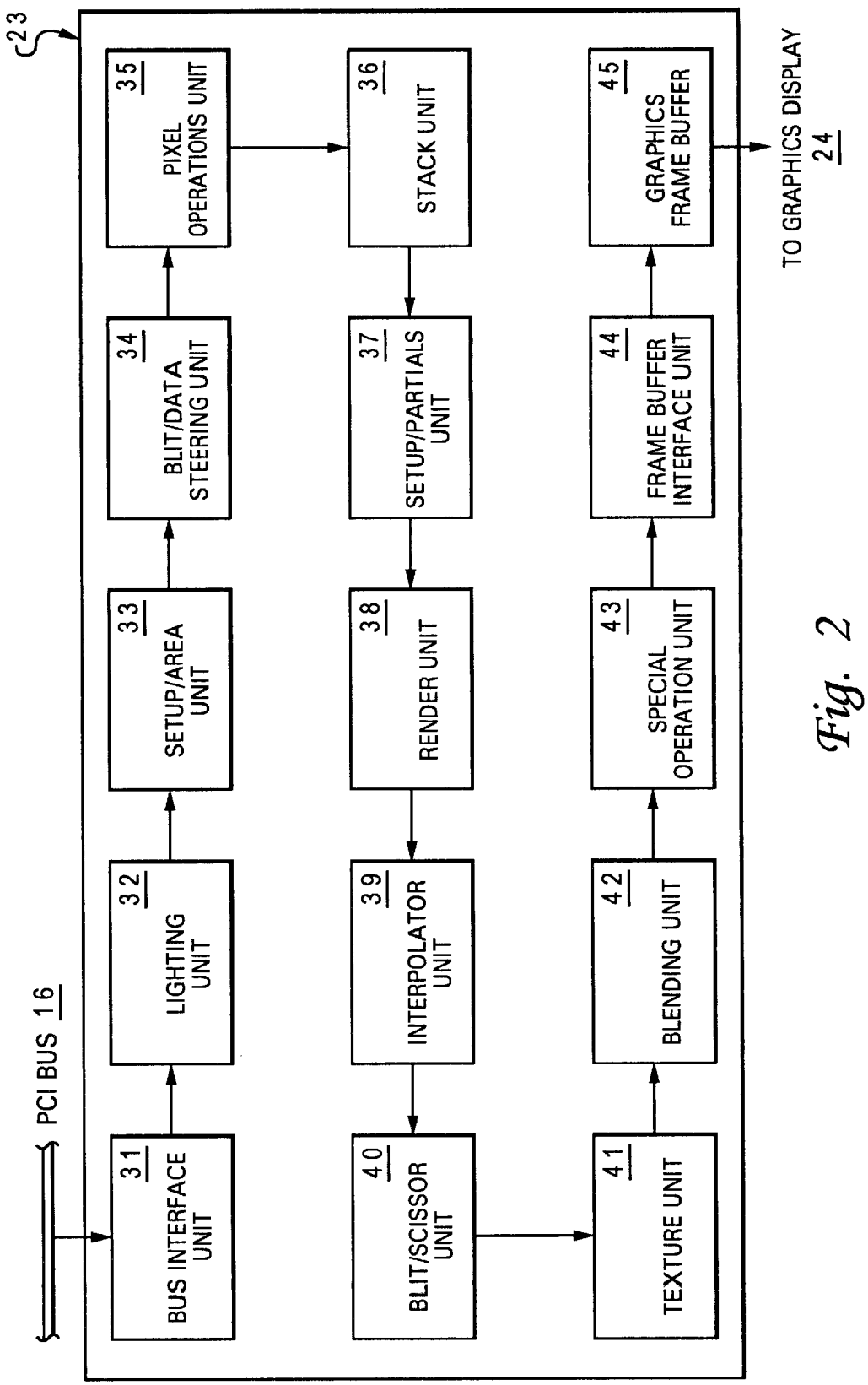
FIG. 2 is a functional block diagram of the graphics adapter from FIG. 1, in accordance with a preferred embodiment of the present invention.

With reference now to FIG. 2, there is illustrated a functional block diagram of graphics adapter 23 from FIG. 1, in accordance with a preferred embodiment of the present invention. As shown, graphics adapter 23, coupled to PCI bus 16, includes a Bus Interface unit 31, a Lighting unit 32, a Setup/area unit 33, a Blit/Data steering unit 34, a Pixel operations unit 35, a Stack unit 36, a Setup/Partials unit 37, a Render unit 38, an Interpolator unit 39, a Blit/Scissor unit 40, a Texture unit 41, a Blending unit 42, a Special Operations unit 43, a Frame Buffer Interface unit 44, and a Graphics frame buffer 45, that sequentially receive and process graphics data. The graphics data is then displayed via graphic display 24. Except for Lighting unit 32, each of the above-mentioned functional units possesses a structure and performs a function that is known to those skilled in the relevant art.

Referring now to FIG. 3, there is illustrated a functional block diagram of lighting unit 32 from FIG. 2, in accordance with a preferred embodiment of the present invention. As shown, lighting unit 32 includes a control module 50, a storage module 51, and a graphics pipeline 57. Graphics pipeline 57 further includes a dot product machine 56, an ambient color component calculation module 52, a diffuse color component calculation module 53, a specular color component calculation module 54, and an accumulator 55. After receiving attributes from bus interface unit 31, control module 50 controls the frequency in which vertices are fed into graphics pipeline 57 and the number of concurrent calculations that are performed for each vertex within graphics pipeline 57. The attributes are preferably specified by a graphics software application. These attributes preferably include: (1) multiple Application Programming Interface (API) selection, (2) one-sided lighting verses two-sided lighting selection, and (3) multiple light sources enablement, details of each will be further described infra.

Storage module 51 provides storage for the attribute information such as scene properties, material properties, and light source properties. Each of the ambient, diffuse, and specular color components is separately evaluated within ambient color component calculation module 52, diffuse color component calculation module 53, and specular color component calculation module 54, respectively. The results from ambient color component calculation module 52, diffuse color component calculation module 53, and specular color component calculation module 54, along with an emissive color component 58, are accumulated within accumulator 55 to produce a final lit color for a specific vertex that is subsequently sent to setup/area unit 33.

Within graphics system 10, a graphics software application typically generates a three-dimensional (3-D) graphics scene and provides the scene along with its lighting attributes to an API such as OpenGL or PHIGS. Both OpenGL and PHIGS define an approximation to a perceived color of an object lit by from various light sources in the form of a lighting equation. The OpenGL lighting equation in its general form is as follows:

$$Color = Matl_{emis} + Matl_{amb} \times Model_{amb} + \sum_{i=0}^{7}(att_i)(spot_i) \quad (1)$$

$$[Matl_{amb} \times L_{amb}(i) + (N \cdot L(i))Matl_{diff} \times L_{diff}(i) + (f_i)(N \cdot H(i))^{se}Matl_{spec} \times L_{spec}(i)]$$

where

| | |
|---|---|
| + | component-wise addition of red, green, and blue channels; |
| × | component-wise multiplication of red, green, and blue channels; |
| · | dot product operation clamped at zero; |
| Matl$_{emis}$ | emissive color of material; |
| Matl$_{amb}$ | ambient color of material; |
| Matl$_{diff}$ | diffuse color of material; |
| Matl$_{spec}$ | specular color of material; |
| Model$_{amb}$ | ambient model color or ambient color of scene; |
| L$_{amb}$(i) | ambient intensity of light source number i; |
| L$_{diff}$(i) | diffuse intensity of light sourse number i; |
| L$_{spec}$(i) | specular intensity of light source number i; |
| N | surface normal vector at vertex (normalized); |
| L(i) | vector pointing from vertex to light source i (normalized); |
| H(i) | half vector corresponding to light source i (normalized) where the non-normalized H(i) = L(i) + (0,0,1) for a viewer at (0,0,∞); |
| se | specular factor; |
| att$_i$ | attenuation factor; |
| spot$_i$ | spotlight effect; |
| f$_i$ | equals 1.0 when N · L > 0 and equals 0.0 otherwise. |

The general form of PHIGS lighting equation is as follows:

$$Color = \sum_{i=0}^{7}(att_i)(spot_i) \quad (2)$$

$$[a_c \times D_s \times L_{amb}(i) + (N \cdot L(i))d_c \times D_s \times L_{diff}(i) + (f_i)(E \cdot R(i))^{se}S_c \times S_s \times L_{spec}(i)]$$

where

| | |
|---|---|
| + | component-wise addition of red, green, and blue channels; |
| × | component-wise multiplication of red, green, and blue channels; |
| · | dot product operation clamped at zero; |
| a$_c$ | ambient reflection coefficient of the surface; |
| d$_c$ | diffuse reflection coefficient of the surface; |
| s$_c$ | specular reflection coefficient of the surface |
| D$_s$ | diffuse color component of the surface; |
| S$_s$ | specular color component of the surface; |
| L$_{amb}$(i) | ambient intensity of light source number i; |
| L$_{diff}$(i) | diffuse intensity of light sourse number i; |
| L$_{spec}$(i) | specular intensity of light source number i; |
| N | surface normal vector at vertex (normalized); |
| L(i) | vector pointing from vertex to light source i (normalized); |
| E | vector pointing from vertex to viewer (normalized); |
| R(i) | reflection vector corresponding to light source i (normalized) where the angle of reflection between N and R = the angle of incidence between L and N; |
| se | specular exponent; |
| att$_i$ | attenuation factor; |

-continued

| | |
|---|---|
| spot$_i$ | spotlight effect; |
| f$_i$ | equals 1.0 when N · L > 0 and equals 0.0 otherwise. |

As a preferred embodiment of the present invention, lighting unit 32 is capable of supporting two APIs (such as OpenGL and PHIGS), one-sided or two-sided lighting, and zero to eight independent light sources. Furthermore, both OpenGL and PHIGS lighting equations are implemented in the form of hardware within graphics pipeline 57.

With reference now to FIGS. 4a–4p, there are depicted a group of tables illustrating how graphics pipeline 57 of FIG. 3 concurrently processes vertices of a graphics object, in accordance with a preferred embodiment of the present invention. As shown, column 61 of table 60 indicates a group of resources that preferably resided within graphics pipeline 57. For example, $A_{24} \times B_{24}$ in row a denotes a 24-by-24 bit multiplier, $A_{24} \times B_{24}$ in row b denotes a second 24-by-24 bit multiplier, $A_{24} \times B_{24}$ in row c denotes a third 24-by-24 bit multiplier, and $A_{48} + B_{48} + C_{48}$ in row abc denotes a 24-bit three-input adder. Thus, graphics pipeline 57 preferably includes 15 multipliers, 2 two-input adders, and 7 three-input adders.

In addition, row 63 indicates various cycle numbers, and there is a total of 32 cycles. A vertex is required to run through all 32 cycles in order to generate a lit color when all eight light sources are enabled. However, only some of the 32 cycles are selectively utilized when less than eight light sources are enabled. All operations listed under each cycle are performed concurrently. Except for RESERVED entries and blank entries, each entry within table 60 details the type of operations performed during the cycle. For example, cycle 1, row a depicts a multiply operation between vector components $N_x$ and $L_x(0)$ (i.e., $N_x \times L_x(0)$), and cycle 5, row c depicts a multiply operation between vector components $N_z$ and $H_z(1)$ (i.e., $N_z \times H_z(1)$). A legend of each symbol utilized within table 60 in FIGS. 4a–4p is as follows:

| | |
|---|---|
| N | Normal Vector |
| $N_x$ | x component of Normal Vector |
| $N_y$ | y component of Normal Vector |
| $N_z$ | z component of Normal Vector |
| L(i) | Light Vector [0–7] |
| $L_x(i)$ | x component of Light Source Vector i, where i = [0,7] |
| $L_y(i)$ | y component of Light Source Vector i, where i = [0,7] |
| $L_z(i)$ | z component of Light Source Vector i, where i = [0,7] |
| H(i) | Half Vector [0–7], which dissects the angle between L and E |
| $H_x(i)$ | x component of Half Vector |
| $H_y(i)$ | y component of Half Vector |
| $H_z(i)$ | z component of Half Vector |
| K(i) | E · L(i) for PHIGS only (a constant for infinite viewer, infinite light) |
| $L_{amb.r}(i)$ | Red Ambient Intensity of Light Number i |
| $L_{diff.r}(i)$ | Red Diffuse Intensity of Light Number i |
| $L_{spec.r}(i)$ | Red Specular Intensity of Light Number i |
| $L_{amb.g}(i)$ | Green Ambient Intensity of Light Number i |
| $L_{diff.g}(i)$ | Green Diffuse Intensity of Light Number i |
| $L_{spec.g}(i)$ | Green Specular Intensity of Light Number i |
| $L_{amb.b}(i)$ | Blue Ambient Intensity of Light Number i |
| $L_{diff.b}(i)$ | Blue Diffuse Intensity of Light Number i |
| $L_{spec.b}(i)$ | Blue Specular Intensity of Light Number i |
| MatlF$_{emis.r}$ | Front Red Emissive Material Color of Object |
| MatlF$_{amb.r}$ | Front Red Ambient Material Color of Object |
| MatlF$_{diff.r}$ | Front Red Diffuse Material Color of Object |
| MatlF$_{spec.r}$ | Front Red Specular Material Color of Object |
| MatlF$_{emis.g}$ | Front Green Emissive Material Color of Object |

-continued

| | |
|---|---|
| MatlF$_{amb.g}$ | Front Green Ambient Material Color of Object |
| MatlF$_{diff.g}$ | Front Green Diffuse Material Color of Object |
| MatlF$_{spec.g}$ | Front Green Specular Material Color of Object |
| MatlF$_{emis.b}$ | Front Blue Emissive Material Color of Object |
| MatlF$_{amb.b}$ | Front Blue Ambient Material Color of Object |
| MatlF$_{diff.b}$ | Front Blue Diffuse Material Color of Object |
| MatlF$_{spec.b}$ | Front Blue Specular Material Color of Object |
| MatlB$_{emis.r}$ | Back Red Emissive Material Color of Object |
| MatlB$_{amb.r}$ | Back Red Ambient Material Color of Object |
| MatlB$_{diff.r}$ | Back Red Diffuse Material Color of Object |
| MatlB$_{spec.r}$ | Back Red Specular Material Color of Object |
| MatlB$_{emis.g}$ | Back Green Emissive Material Color of Object |
| MatlB$_{amb.g}$ | Back Green Ambient Material Color of Object |
| MatlB$_{diff.g}$ | Back Green Diffuse Material Color of Object |
| MatlB$_{spec.g}$ | Back Green Specular Material Color of Object |
| MatlB$_{emis.b}$ | Back Blue Emissive Material Color of Object |
| MatlB$_{amb.b}$ | Back Blue Ambient Material Color of Object |
| MatlB$_{diff.b}$ | Back Blue Diffuse Material Color of Object |
| MatlB$_{spec.b}$ | Back Blue Specular Material Color of Object |
| cutoffFront | Used during calculation of $(N \cdot H)^{se}$ for OpenGL or $(E \cdot R)^{se}$ for PHIGS |
| cutoffBack | Used during calculation of $(\overline{N \cdot H})^{se}$ for OpenGL or $(\overline{E \cdot R})^{se}$ for PHIGS |
| invDelta Front | Used during calculation of $(N \cdot H)^{se}$ for OpenGL or $(E \cdot R)^{se}$ for PHIGS |
| invDeltaBack | Used during calculation of $(\overline{N \cdot H})^{se}$ for OpenGL or $(\overline{E \cdot R})^{se}$ for PHIGS |
| $D_f(i_{fj})$ | Used during calculation of $(N \cdot H)^{se}$ for OpenGL or $(E \cdot R)^{se}$ for PHIGS where j = [0,7] |
| $D_f(i_{fj} + 1)$ | Used during calculation of $(\overline{N \cdot H})^{se}$ for OpenGL or $(\overline{E \cdot R})^{se}$ for PHIGS where j = [0,7] |
| $D_b(i_{bj})$ | Used during calculation of $(N \cdot H)^{se}$ for OpenGL or $(E \cdot R)^{se}$ for PHIGS where j = [0,7] |
| $D_b(i_{bj} + 1)$ | Used during calculation of $(\overline{N \cdot H})^{se}$ for OpenGL or $(\overline{E \cdot R})^{se}$ for PHIGS where j = [0,7] |
| $C_{FADr}$ | Front Red Emissive/Ambient/Diffuse Lit Color of Object |
| $C_{BADr}$ | Back Red Emissive/Ambient/Diffuse Lit Color of Object |
| $C_r$ | Front or Back, Red, Specular or Emissive/Ambient/Diffuse/Specular Lit Color of Object |
| $C_{FADg}$ | Front Green Emissive/Ambient/Diffuse Lit Color of Object |
| $C_{BADg}$ | Back Green Emissive/Ambient/Diffuse Lit Color of Object |
| $C_g$ | Front or Back, Green, Specular or Emissive/Ambient/Diffuse/Specular Lit Color of Object |
| $C_{FADb}$ | Front Blue Emissive/Ambient/Diffuse Lit Color of Object |
| $C_{BADb}$ | Back Blue Emissive/Ambient/Diffuse Lit Color of Object |
| $C_b$ | Front or Back, Blue, Specular or Emissive/Ambient/Diffuse/Specular Lit Color of Object |

The shaded region of table 60 indicates that lighting calculations are being performed on a second vertex concurrently with the calculations for the first vertex within the graphics pipeline. Depending on the attributes, up to four vertices can preferably be within the graphics pipeline simultaneously, and calculations can be performed on all four vertices concurrently.

As mentioned previously, attributes from a graphics software application preferably includes (1) multiple API selection, (2) one-sided or two-sided lighting selection, and (3) multiple light sources enablement. Depending on the attributes selected, control module 50 directs the corresponding resources within graphics pipeline 57 from FIG. 3 to produce a lit color for a vertex, according to table 60 in FIGS. 4a–4p. For example, if an OpenGL, one-sided lighting calculation having light source number three enabled (the other light sources are disabled) is selected, then each vertex will have to go through cycles 10, 11, 25, 26, 28, 29, 31, and 32 in table 60 from FIGS. 4a–4p. So, in this example, it takes eight cycles to complete the lighting calculation for each vertex. Notice that a second vertex is fed into graphics pipeline 57 in cycle 25, which is the third of the above-mentioned cycles in this example. Also, a third vertex is fed into graphics pipeline 57 in cycle 28, and a forth vertex in cycle 31. So, a new vertex is fed into graphics pipeline 57 every second cycle (i.e., 10, 25, 28, 31), and graphics pipeline 57 is working on four vertices simultaneously. As another example, if a PHIGS, two-sided lighting calculation having light sources number one, four, and seven enabled (the other light sources are disabled) is selected, then each vertex will have to go through cycles 4, 5, 6, 13, 14, 15, 22, 23, 24, 25, 26, 27, 28, 29, 30, 31, and 32 in table 60 from FIGS. 4a–4p. So, in this example, it takes seventeen cycles to complete the lighting calculation for each vertex. Again, a second vertex is fed into graphics pipeline 57 in cycle 25, which is the tenth of the above-mentioned cycles in this example. Thus, a new vertex is fed into graphics pipeline 57 every ninth cycle (i.e., 4, 25, etc.), and graphics pipeline 57 is working on two vertices simultaneously.

Figure 5C:
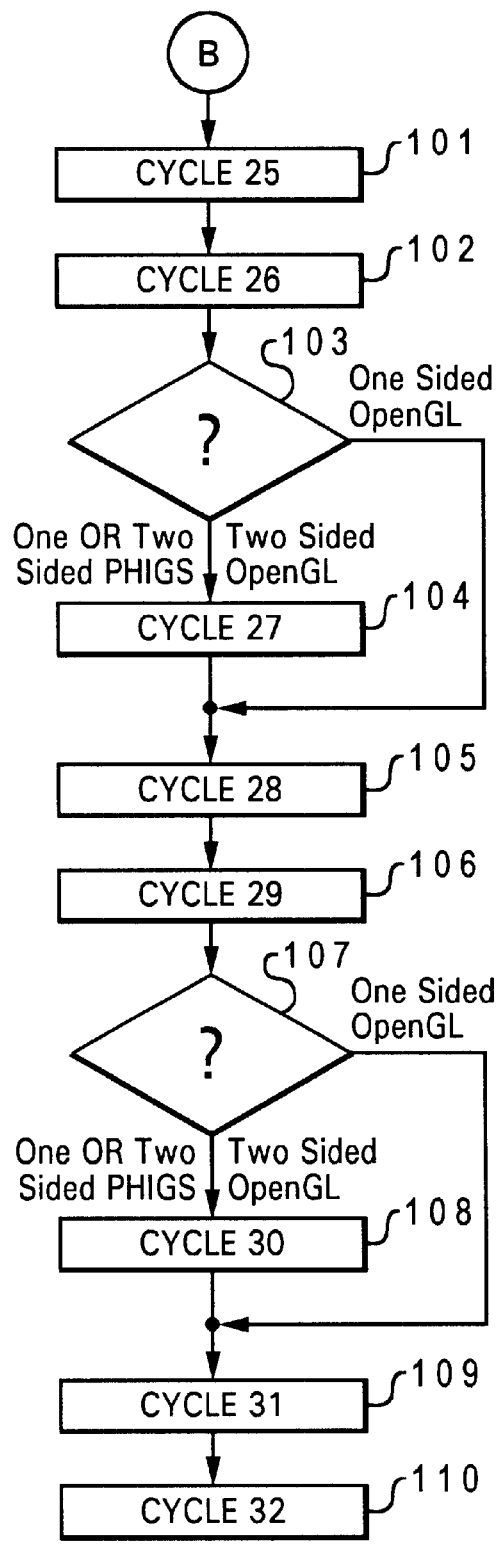

Referring now to FIGS. 5a–5c, there are illustrated several high-level logic flow diagrams depicting how control module 50 and graphics pipeline 57 of FIG. 3 concurrently processes vertices of a graphics object, in accordance with a preferred embodiment of the present invention. An incoming vertex enters the graphics pipeline at block 60, a determination is made as to whether or not a $0^{th}$ light source is enabled, as shown in block 61. If the $0^{th}$ light source is not enabled, the process proceeds to block 66; otherwise, the operations listed under cycles 1 and 2 of FIG. 4a are performed, as depicted in blocks 62 and 63, respectively. A determination is made as to whether or not one-sided lighting/OpenGL API attributes are selected for the 10 vertex, as illustrated in block 64. If one-sided lighting/OpenGL API attributes are selected for the vertex, the process proceeds to block 66; otherwise the operations listed under cycle 3 of FIG. 4a are performed, as shown in block 65.

Next, a determination is made as to whether or not a $1^{st}$ light source is enabled, as shown in block 66. If the $1^{st}$ light source is not enabled, the process proceeds to block 71; otherwise, the operations listed under cycles 4 and 5 of FIG. 4a are performed, as depicted in blocks 67 and 68, respectively. A determination is made as to whether or not one-sided lighting/OpenGL API attributes are selected for the vertex, as illustrated in block 69. If one-sided lighting/OpenGL API attributes are selected for the vertex, the process proceeds to block 71; otherwise the operations listed under cycle 6 of FIG. 4b are performed, as shown in block 70.

Next, a determination is made as to whether or not a $2^{nd}$ light source is enabled, as shown in block 71. If the $2^{nd}$ light source is not enabled, the process proceeds to block 76; otherwise, the operations listed under cycles 7 and 8 of FIG. 4b are performed, as depicted in blocks 72 and 73, respectively. A determination is made as to whether or not one-sided lighting/OpenGL API attributes are selected for the vertex, as illustrated in block 74. If one-sided lighting/OpenGL API attributes are selected for the vertex, the process proceeds to block 76; otherwise the operations listed under cycle 9 of FIG. 4b are performed, as shown in block 75.

Next, a determination is made as to whether or not a $3^{rd}$ light source is enabled, as shown in block 76. If the $3^{rd}$ light source is not enabled, the process proceeds to block 81; otherwise, the operations listed under cycle 10 of FIG. 4b and cycle 11 of FIG. 4c are performed, as depicted in blocks 77 and 78, respectively. A determination is made as to whether or not one-sided lighting/OpenGL API attributes are selected for the vertex, as illustrated in block 79. If one-sided lighting/OpenGL API attributes are selected for the vertex, the process proceeds to block 81; otherwise the operations listed under cycle 12 of FIG. 4c are performed, as shown in block 80.

Next, a determination is made as to whether or not a $4^{th}$ light source is enabled, as shown in block 81. If the $4^{th}$ light source is not enabled, the process proceeds to block 86; otherwise, the operations listed under cycles 13 and 14 of FIG. 4c are performed, as depicted in blocks 82 and 83, respectively. A determination is made as to whether or not one-sided lighting/OpenGL API attributes are selected for the vertex, as illustrated in block 84. If one-sided lighting/OpenGL API attributes are selected for the vertex, the process proceeds to block 86; otherwise the operations listed under cycle 15 of FIG. 4c are performed, as shown in block 85.

Next, a determination is made as to whether or not a $5^{th}$ light source is enabled, as shown in block 86. If the $5^{th}$ light source is not enabled, the process proceeds to block 91; otherwise, the operations listed under cycles 16 and 17 of FIG. 4d are performed, as depicted in blocks 87 and 88, respectively. A determination is made as to whether or not one-sided lighting/OpenGL API attributes are selected for the vertex, as illustrated in block 89. If one-sided lighting/OpenGL API attributes are selected for the vertex, the process proceeds to block 91; otherwise the operations listed under cycle 18 of FIG. 4d are performed, as shown in block 90.

Next, a determination is made as to whether or not a $6^{th}$ light source is enabled, as shown in block 91. If the $6^{th}$ light source is not enabled, the process proceeds to block 96; otherwise, the operations listed under cycles 19 and 20 of FIG. 4c are performed, as depicted in blocks 92 and 93, respectively. A determination is made as to whether or not one-sided lighting/OpenGL API attributes are selected for the vertex, as illustrated in block 94. If one-sided lighting/OpenGL API attributes are selected for the vertex, the process proceeds to block 96; otherwise the operations listed under cycle 21 of FIG. 4e are performed, as shown in block 95.

Next, a determination is made as to whether or not a $7^{th}$ light source is enabled, as shown in block 96. If the $7^{th}$ light source is not enabled, the process proceeds to block 101; otherwise, the operations listed under cycles 22 and 23 of FIG. 4e are performed, as depicted in blocks 97 and 98, respectively. A determination is made as to whether or not one-sided lighting/OpenGL API attributes are selected for the vertex, as illustrated in block 99. If one-sided lighting/OpenGL API attributes are selected for the vertex, the process proceeds to block 101; otherwise the operations listed under cycle 24 of FIG. 4e are performed, as shown in block 100.

Next, the operations listed under cycles 25 and 26 of FIG. 4f are performed, as depicted in blocks 101 and 102, respectively. A determination is made as to whether or not one-sided lighting/OpenGL API attributes are selected for the vertex, as illustrated in block 103. If one-sided lighting/OpenGL API attributes are selected for the vertex, the process proceeds to block 105; otherwise the operations listed under cycle 27 of FIG. 4f are performed, as shown in block 104.

Next, the operations listed under cycle 28 of FIG. 4n and cycle 29 of FIG. 4o are performed, as depicted in blocks 105 and 106, respectively. A determination is made as to whether or not one-sided lighting/OpenGL API attributes are selected for the vertex, as illustrated in block 107. If one-sided lighting/OpenGL API attributes are selected for the vertex, the process proceeds to block 109; otherwise the operations listed under cycle 30 of FIG. 4o are performed, as shown in block 108. Finally, the operations listed under cycles 31 and 32 of FIG. 4p are performed, as depicted in blocks 109 and 110, respectively.

As has been described, the present invention provides a graphics adapter having a versatile lighting engine. After receiving attributes from a graphics software application, a control module within the lighting engine controls the frequency in which vertices are fed into the graphics pipeline and controls the number of concurrent calculations for each vertex that has been fed into the graphics pipeline. The control module is flexible enough to maintain the same efficient utilization of resources regardless of the number of active light sources.

While the invention has been particularly shown and described with reference to a preferred embodiment, it will be understood by those skilled in the art that various changes in form and detail may be made therein without departing from the spirit and scope of the invention.

What is claimed is:

1. A graphics adapter for generating graphics objects in a graphics scene, wherein each of said graphics objects is made up of a number of polygons that are delimited by a set of vertices, said graphics adapter comprising:

a diffuse color component calculation module for evaluating a diffuse color component;

a specular color component calculation module for evaluating a specular color component; and a control module, coupled to said diffuse color component calculation module and said specular color component calculation module, for selectively controlling a frequency at which vertices are fed into said diffuse color component calculation module and said specular color component calculation module and for controlling a number of concurrent calculations that are performed on vertices within said diffuse color component calculation module and said specular color component calculation module, in response to attributes received from a graphics software application.

2. The graphics adapter according to claim 1, wherein said attributes from a graphics software application includes multiple Application Programming Interface selection.

3. The graphics adapter according to claim 1, wherein said attributes from a graphics software application includes one-sided or two-sided lighting selection.

4. The graphics adapter according to claim 1, wherein said attributes from a graphics software application includes multiple light sources enablement.

5. The graphics adapter according to claim 1, wherein said graphics adapter further includes:

a specular color component calculation module, coupled to said control module, for evaluating a specular color component.

6. The graphics adapter according to claim 5, wherein said graphics adapter further includes an accumulator, coupled to said ambient color component calculation module, said diffuse color component calculation module, and said specular color component calculation module, for accumulating said ambient color component, said diffuse color component, said specular color component, and an emissive color component to produce a final lit color.

7. The graphics adapter according to claim 1, wherein said graphics adapter further includes a storage module for storing attribute information.

8. A graphics system for generating graphics objects in a graphics scene, wherein each of said graphics objects is made up of a number of polygons that are delimited by a set of vertices, said graphics system comprising:

a processor;

an input device, coupled to said processor, for receiving signals;

a graphics adapter, coupled to said processor, wherein said graphics adapter further includes a diffuse color component calculation module for evaluating a diffuse color component;

a specular color component calculation module for evaluating a specular color component; and a control module, coupled to said diffuse color component calculation module and said specular color component calculation module, for selectively controlling a frequency at which vertices are fed into said diffuse color component calculation module and said specular color component calculation module and for controlling a number of concurrent calculations that are performed on vertices within said diffuse color component calculation module and said specular color component calculation module, in response to attributes received from a graphics software application; and a display, coupled to said processor, for displaying graphics.

9. The graphics system according to claim 8, wherein said attributes from a graphics software application includes multiple Application Programming Interface selection.

10. The graphics system according to claim 8, wherein said attributes from a graphics software application includes one-sided or two-sided lighting selection.

11. The graphics system according to claim 8, wherein said attributes from a graphics software application includes multiple light sources enablement.

12. The graphics system according to claim 8, wherein said graphics adapter further includes:

a specular color component calculation module, coupled to said control module, for evaluating a specular color component.

13. The graphics system according to claim 12, wherein said graphics system further includes an accumulator, coupled to said ambient color component calculation module, said diffuse color component calculation module, and said specular color component calculation module, for accumulating said ambient color component, said diffuse color component, said specular color component, and an emissive color component to produce a final lit color.

14. The graphics system according to claim 8, wherein said graphics system further includes storage module for storing attribute information.

* * * * *